US008811348B2

(12) United States Patent
Rangan et al.

(10) Patent No.: US 8,811,348 B2
(45) Date of Patent: Aug. 19, 2014

(54) METHODS AND APPARATUS FOR GENERATING, COMMUNICATING, AND/OR USING INFORMATION RELATING TO SELF-NOISE

(75) Inventors: Sundeep Rangan, Jersey City, NJ (US); Rajiv Laroia, Far Hills, NJ (US); Arnab Das, Bethesda, MD (US); Junyi Li, Chester, NJ (US); John Fan, Livingston, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 320 days.

(21) Appl. No.: 11/333,788

(22) Filed: Jan. 17, 2006

(65) Prior Publication Data

US 2007/0149126 A1 Jun. 28, 2007
US 2014/0134953 A9 May 15, 2014

Related U.S. Application Data

(63) Continuation-in-part of application No. 10/648,766, filed on Aug. 25, 2003, now Pat. No. 7,218,948, and a continuation-in-part of application No. 10/648,767, filed on Aug. 25, 2003.

(60) Provisional application No. 60/752,973, filed on Dec. 22, 2005, provisional application No. 60/449,729, filed on Feb. 24, 2003.

(51) Int. Cl.
*H04W 4/00* (2009.01)

(52) U.S. Cl.
USPC ........... 370/332; 370/317; 370/318; 370/310; 370/230; 370/347; 455/522; 455/423; 455/13.4; 455/67.13; 455/63.1

(58) Field of Classification Search
USPC .............. 370/347, 230, 310; 455/63.1, 67.11, 455/522, 67.13
See application file for complete search history.

(56) References Cited

U.S. PATENT DOCUMENTS 4,631,720 A 12/1986 Koeck
(Continued)

FOREIGN PATENT DOCUMENTS

| CL | 3603-2006 | 12/2006 |
|---|---|---|
| CL | 3604-2006 | 12/2006 |

(Continued)

OTHER PUBLICATIONS

International Search Report, PCT/US06/048513, International Search Authority, European Patent Office, Feb. 4, 2008.

(Continued)

*Primary Examiner* — Wayne Cai
(74) *Attorney, Agent, or Firm* — Sam Talpalatsky; Nicholas J. Pauley; Joseph Agusta

(57) ABSTRACT

A wireless terminal measures the received power of a tone corresponding to an intention base station null output, measures the received power of pilot signals, and determines a signal to noise ratio of the received pilot signal. The wireless terminal calculates a downlink signal to noise ratio saturation level representative of the SNR of a received downlink signal that the wireless terminal would measure on a received signal transmitted by the base station at infinite power. The calculated downlink signal to noise ratio saturation level is a function of the determined interference power, the measured received pilot signal power, and the determined pilot signal SNR. A report is generated corresponding to one of a plurality of quantized levels, the selected quantized level being the closest representation to the calculated downlink signal to noise ratio saturation level. The generated report is communicated using a dedicated control channel segment in a predetermined uplink timing structure.

31 Claims, 8 Drawing Sheets

(56) References Cited

U.S. PATENT DOCUMENTS

| | | | |
|---|---|---|---|
| 4,660,196 A * | 4/1987 | Gray et al. | 370/326 |
| 4,679,244 A | 7/1987 | Kawasaki et al. | |
| 4,833,701 A | 5/1989 | Comroe et al. | |
| 5,128,938 A | 7/1992 | Borras | |
| 5,203,013 A * | 4/1993 | Breeden et al. | 455/434 |
| 5,387,905 A | 2/1995 | Grube et al. | |
| 5,434,848 A | 7/1995 | Chimento, Jr. et al. | |
| 5,461,645 A | 10/1995 | Ishii | |
| 5,465,389 A | 11/1995 | Agrawal et al. | |
| 5,506,865 A | 4/1996 | Weaver, Jr. | |
| 5,537,414 A | 7/1996 | Takiyasu et al. | |
| 5,579,307 A | 11/1996 | Richetta et al. | |
| 5,732,328 A | 3/1998 | Mitra et al. | |
| 5,835,847 A | 11/1998 | Gilmore et al. | |
| 5,867,478 A | 2/1999 | Baum et al. | |
| 5,898,925 A | 4/1999 | Honkasalo et al. | |
| 5,914,950 A | 6/1999 | Tiedemann, Jr. et al. | |
| 5,915,221 A | 6/1999 | Sawyer et al. | |
| 5,923,650 A | 7/1999 | Chen et al. | |
| 5,933,421 A | 8/1999 | Alamouti et al. | |
| 5,940,771 A | 8/1999 | Gollnick et al. | |
| 5,966,657 A | 10/1999 | Sporre | |
| 5,966,662 A | 10/1999 | Murto | |
| 5,978,657 A | 11/1999 | Suzuki | |
| 5,999,534 A | 12/1999 | Kim | |
| 6,002,676 A | 12/1999 | Fleming | |
| 6,004,276 A | 12/1999 | Wright et al. | |
| 6,026,081 A | 2/2000 | Hamabe | |
| 6,028,842 A | 2/2000 | Chapman et al. | |
| 6,028,843 A | 2/2000 | Delp et al. | |
| 6,035,000 A | 3/2000 | Bingham | |
| 6,069,871 A | 5/2000 | Sharma et al. | |
| 6,070,072 A | 5/2000 | Dorenbosch et al. | |
| 6,073,025 A | 6/2000 | Chheda et al. | |
| 6,075,025 A | 6/2000 | Bishop et al. | |
| 6,122,270 A | 9/2000 | Whinnett et al. | |
| 6,128,506 A | 10/2000 | Knutsson et al. | |
| 6,131,016 A | 10/2000 | Greenstein et al. | |
| 6,141,565 A | 10/2000 | Feuerstein et al. | |
| 6,169,896 B1 | 1/2001 | Sant et al. | |
| 6,173,005 B1 | 1/2001 | Kotzin et al. | |
| 6,181,948 B1 | 1/2001 | Kondo | |
| 6,201,793 B1 | 3/2001 | Chen et al. | |
| 6,205,129 B1 | 3/2001 | Esteves et al. | |
| 6,215,791 B1 | 4/2001 | Kim | |
| 6,236,646 B1 | 5/2001 | Beming et al. | |
| 6,256,478 B1 | 7/2001 | Allen et al. | |
| 6,259,927 B1 | 7/2001 | Butovitsch et al. | |
| 6,263,392 B1 | 7/2001 | McCauley | |
| 6,298,233 B1 | 10/2001 | Souissi et al. | |
| 6,308,080 B1 | 10/2001 | Burt et al. | |
| 6,310,857 B1 | 10/2001 | Duffield et al. | |
| 6,311,065 B1 | 10/2001 | Ushiki et al. | |
| 6,374,085 B1 | 4/2002 | Saints et al. | |
| 6,377,583 B1 | 4/2002 | Lyles et al. | |
| 6,377,955 B1 | 4/2002 | Hartmann et al. | |
| 6,405,047 B1 | 6/2002 | Moon | |
| 6,414,946 B1 * | 7/2002 | Satou et al. | 370/328 |
| 6,445,917 B1 | 9/2002 | Bark et al. | |
| 6,453,151 B1 | 9/2002 | Kiang et al. | |
| 6,493,539 B1 | 12/2002 | Falco et al. | |
| 6,526,281 B1 | 2/2003 | Gorsuch et al. | |
| 6,538,986 B2 * | 3/2003 | Isaksson et al. | 370/207 |
| 6,545,999 B1 | 4/2003 | Sugita | |
| 6,549,780 B2 | 4/2003 | Schiff et al. | |
| 6,553,336 B1 | 4/2003 | Johnson et al. | |
| 6,590,890 B1 | 7/2003 | Stolyar et al. | |
| 6,597,914 B1 | 7/2003 | Silventoinen et al. | |
| 6,600,903 B1 | 7/2003 | Lilja et al. | |
| 6,609,007 B1 | 8/2003 | Eibling et al. | |
| 6,621,808 B1 | 9/2003 | Sadri | |
| 6,625,133 B1 | 9/2003 | Balachandran et al. | |
| 6,662,024 B2 | 12/2003 | Walton et al. | |
| 6,671,512 B2 | 12/2003 | Laakso | |
| 6,680,909 B1 | 1/2004 | Bansal et al. | |
| 6,697,417 B2 | 2/2004 | Fernandez-Corbaton et al. | |
| 6,710,651 B2 | 3/2004 | Forrester | |
| 6,728,551 B2 | 4/2004 | Chang | |
| 6,742,020 B1 | 5/2004 | Dimitroff et al. | |
| 6,745,003 B1 * | 6/2004 | Maca et al. | 455/11.1 |
| 6,751,187 B2 | 6/2004 | Walton et al. | |
| 6,771,934 B2 | 8/2004 | Demers et al. | |
| 6,788,963 B2 | 9/2004 | Laroia et al. | |
| 6,798,761 B2 | 9/2004 | Cain et al. | |
| 6,804,289 B2 | 10/2004 | Takahashi | |
| 6,804,521 B2 | 10/2004 | Tong et al. | |
| 6,816,476 B2 | 11/2004 | Kim et al. | |
| 6,836,673 B1 * | 12/2004 | Trott | 455/562.1 |
| 6,865,168 B1 | 3/2005 | Sekine | |
| 6,889,056 B2 | 5/2005 | Shibutani | |
| 6,892,071 B2 | 5/2005 | Park et al. | |
| 6,895,005 B1 | 5/2005 | Malin et al. | |
| 6,895,364 B2 | 5/2005 | Banfer | |
| 6,901,268 B2 | 5/2005 | Chang | |
| 6,901,270 B1 | 5/2005 | Beach | |
| 6,904,016 B2 | 6/2005 | Kuo et al. | |
| 6,912,405 B2 | 6/2005 | Hiramatsu et al. | |
| 6,917,607 B1 | 7/2005 | Yeom et al. | |
| 6,940,827 B2 | 9/2005 | Li et al. | |
| 6,954,643 B2 | 10/2005 | Petrus | |
| 6,957,072 B2 | 10/2005 | Kangras et al. | |
| 6,967,937 B1 | 11/2005 | Gormley | |
| 6,968,156 B2 | 11/2005 | Sugaya et al. | |
| 7,006,841 B2 | 2/2006 | Monogioudis et al. | |
| 7,024,460 B2 | 4/2006 | Koopmas et al. | |
| 7,027,782 B2 * | 4/2006 | Moon et al. | 455/102 |
| 7,031,983 B2 | 4/2006 | Israni et al. | |
| 7,034,254 B2 | 4/2006 | Grabowski et al. | |
| 7,039,029 B2 | 5/2006 | Lee et al. | |
| 7,043,254 B2 | 5/2006 | Chawla et al. | |
| 7,047,009 B2 | 5/2006 | Laroia et al. | |
| 7,054,643 B2 | 5/2006 | Trossen et al. | |
| 7,061,885 B2 | 6/2006 | Kurtz et al. | |
| 7,092,672 B1 | 8/2006 | Pekonen et al. | |
| 7,120,123 B1 * | 10/2006 | Quigley et al. | 370/252 |
| 7,120,448 B2 | 10/2006 | Brouwer et al. | |
| 7,123,910 B2 | 10/2006 | Lucidarme et al. | |
| 7,139,536 B2 | 11/2006 | Chiu | |
| 7,142,548 B2 | 11/2006 | Fong et al. | |
| 7,146,172 B2 | 12/2006 | Li et al. | |
| 7,158,796 B2 | 1/2007 | Tiedemann, Jr. et al. | |
| 7,161,909 B2 | 1/2007 | Sharma | |
| 7,162,203 B1 | 1/2007 | Brunner | |
| 7,164,883 B2 | 1/2007 | Rappaport et al. | |
| 7,197,025 B2 | 3/2007 | Chuah | |
| 7,203,493 B2 | 4/2007 | Fujii et al. | |
| 7,212,821 B2 | 5/2007 | Laroia et | |
| 7,218,948 B2 | 5/2007 | Laroia et al. | |
| 7,245,935 B2 | 7/2007 | Lin et al. | |
| 7,260,054 B2 | 8/2007 | Olszewski | |
| 7,269,406 B2 | 9/2007 | Qi | |
| 7,277,709 B2 | 10/2007 | Vadgama | |
| 7,277,737 B1 | 10/2007 | Vollmer et al. | |
| 7,280,814 B2 | 10/2007 | Austin et al. | |
| 7,283,559 B2 | 10/2007 | Cho et al. | |
| 7,283,836 B2 | 10/2007 | Hwang et al. | |
| 7,299,277 B1 | 11/2007 | Moran et al. | |
| 7,317,921 B2 | 1/2008 | Mueckenheim et al. | |
| 7,319,680 B2 | 1/2008 | Cho | |
| 7,321,563 B2 | 1/2008 | Kim et al. | |
| 7,340,267 B2 | 3/2008 | Budka et al. | |
| 7,349,667 B2 | 3/2008 | Magee et al. | |
| 7,356,635 B2 | 4/2008 | Woodings et al. | |
| 7,362,702 B2 | 4/2008 | Terrell et al. | |
| 7,382,755 B2 | 6/2008 | Dugad et al. | |
| 7,395,058 B1 | 7/2008 | Kalofonos et al. | |
| 7,397,803 B2 | 7/2008 | Love et al. | |
| 7,400,901 B2 | 7/2008 | Kostic et al. | |
| 7,412,265 B2 | 8/2008 | Chen et al. | |
| 7,418,260 B2 | 8/2008 | Lucidarme | |
| 7,420,939 B2 | 9/2008 | Laroia et al. | |
| 7,430,206 B2 | 9/2008 | Terry et al. | |
| 7,430,207 B2 | 9/2008 | Wu et al. | |
| 7,430,420 B2 | 9/2008 | Derakhshan et al. | |

(56) References Cited

U.S. PATENT DOCUMENTS

| | | |
|---|---|---|
| 7,447,148 B2 | 11/2008 | Gao et al. |
| 7,463,577 B2 | 12/2008 | Sudo et al. |
| 7,486,620 B2 | 2/2009 | Seol |
| 7,486,638 B2 | 2/2009 | Ofuji et al. |
| 7,502,614 B2 | 3/2009 | Uchida et al. |
| 7,508,792 B2 | 3/2009 | Petrovic et al. |
| 7,510,828 B2 | 3/2009 | Lynn et al. |
| 7,512,076 B2 | 3/2009 | Kwon et al. |
| 7,512,185 B2 | 3/2009 | Sharon et al. |
| 7,519,013 B2 | 4/2009 | Destino et al. |
| 7,519,033 B2 | 4/2009 | Soomro |
| 7,522,544 B2 | 4/2009 | Cheng et al. |
| 7,525,971 B2 | 4/2009 | Carroll et al. |
| 7,526,091 B2 | 4/2009 | Jeong et al. |
| 7,539,475 B2 | 5/2009 | Laroia et al. |
| 7,558,235 B2 | 7/2009 | Lester et al. |
| 7,558,572 B2 | 7/2009 | Anigstein |
| 7,561,893 B2 | 7/2009 | Moulsley et al. |
| 7,668,573 B2 | 2/2010 | Laroia et al. |
| 7,743,284 B1 | 6/2010 | Taylor et al. |
| 8,437,251 B2 | 5/2013 | Das et al. |
| 8,503,938 B2 | 8/2013 | Laroia et al. |
| 2001/0036181 A1 | 11/2001 | Rogers |
| 2001/0046878 A1 | 11/2001 | Chang et al. |
| 2002/0031105 A1 | 3/2002 | Zeira et al. |
| 2002/0037729 A1 | 3/2002 | Kitazawa et al. |
| 2002/0045448 A1 | 4/2002 | Park et al. |
| 2002/0049040 A1 | 4/2002 | Sugaya et al. |
| 2002/0075835 A1 | 6/2002 | Krishnakumar et al. |
| 2002/0077140 A1* | 6/2002 | Monogioudis et al. ........ 455/522 |
| 2002/0080967 A1 | 6/2002 | Abdo et al. |
| 2002/0082011 A1 | 6/2002 | Fujii et al. |
| 2002/0085516 A1 | 7/2002 | Bridgelall |
| 2002/0093953 A1 | 7/2002 | Naim et al. |
| 2002/0107028 A1 | 8/2002 | Rantalainen et al. |
| 2002/0122431 A1 | 9/2002 | Cho et al. |
| 2002/0136195 A1* | 9/2002 | Kurtz ........................... 370/347 |
| 2002/0142788 A1 | 10/2002 | Chawla et al. |
| 2002/0143858 A1 | 10/2002 | Teague et al. |
| 2002/0147017 A1 | 10/2002 | Li et al. |
| 2002/0160802 A1 | 10/2002 | Hiramatsu et al. |
| 2002/0177452 A1 | 11/2002 | Ruutu et al. |
| 2002/0186678 A1 | 12/2002 | Averbuch et al. |
| 2003/0003921 A1 | 1/2003 | Laakso et al. |
| 2003/0007498 A1 | 1/2003 | Angle et al. |
| 2003/0012212 A1 | 1/2003 | Earnshaw et al. |
| 2003/0027587 A1 | 2/2003 | Proctor, Jr. |
| 2003/0064737 A1* | 4/2003 | Eriksson et al. .............. 455/501 |
| 2003/0078067 A1 | 4/2003 | Kim et al. |
| 2003/0083069 A1 | 5/2003 | Vadgama |
| 2003/0095519 A1 | 5/2003 | Kuo et al. |
| 2003/0114180 A1 | 6/2003 | Black et al. |
| 2003/0123396 A1 | 7/2003 | Seo et al. |
| 2003/0123410 A1 | 7/2003 | Youm |
| 2003/0139197 A1 | 7/2003 | Kostic et al. |
| 2003/0144042 A1 | 7/2003 | Weinfield et al. |
| 2003/0157899 A1* | 8/2003 | Trossen et al. ................. 455/69 |
| 2003/0169705 A1 | 9/2003 | Knisely et al. |
| 2003/0185224 A1 | 10/2003 | Ramanan et al. |
| 2003/0185285 A1 | 10/2003 | Talwar |
| 2003/0193915 A1 | 10/2003 | Lee et al. |
| 2003/0198204 A1 | 10/2003 | Taneja et al. |
| 2003/0198206 A1 | 10/2003 | Cain et al. |
| 2003/0206541 A1 | 11/2003 | Yun et al. |
| 2003/0207691 A1 | 11/2003 | Chen |
| 2003/0207693 A1 | 11/2003 | Roderique |
| 2003/0214906 A1 | 11/2003 | Hu et al. |
| 2003/0214928 A1 | 11/2003 | Chuah et al. |
| 2003/0223354 A1 | 12/2003 | Olszewski et al. |
| 2004/0001429 A1 | 1/2004 | Ma et al. |
| 2004/0004954 A1 | 1/2004 | Terry et al. |
| 2004/0013103 A1 | 1/2004 | Zhang et al. |
| 2004/0057402 A1 | 3/2004 | Ramos et al. |
| 2004/0062206 A1 | 4/2004 | Soong et al. |
| 2004/0081089 A1 | 4/2004 | Ayyagari |
| 2004/0082344 A1 | 4/2004 | Moilanen et al. |
| 2004/0085936 A1 | 5/2004 | Gopalakrishnan et al. |
| 2004/0091026 A1 | 5/2004 | Nakayama |
| 2004/0111640 A1 | 6/2004 | Baum |
| 2004/0120411 A1 | 6/2004 | Walton et al. |
| 2004/0125776 A1 | 7/2004 | Haugli et al. |
| 2004/0127226 A1 | 7/2004 | Dugad et al. |
| 2004/0141466 A1* | 7/2004 | Kim et al. ..................... 370/252 |
| 2004/0147262 A1 | 7/2004 | Lescuyer et al. |
| 2004/0147276 A1 | 7/2004 | Gholmieh et al. |
| 2004/0160922 A1 | 8/2004 | Nanda et al. |
| 2004/0166869 A1 | 8/2004 | Laroia et al. |
| 2004/0166886 A1 | 8/2004 | Laroia et al. |
| 2004/0166887 A1 | 8/2004 | Laroia et al. |
| 2004/0180658 A1 | 9/2004 | Uchida et al. |
| 2004/0184410 A1 | 9/2004 | Park |
| 2004/0192371 A1* | 9/2004 | Zhao et al. ..................... 455/522 |
| 2004/0196802 A1 | 10/2004 | Bae et al. |
| 2004/0203717 A1 | 10/2004 | Wingrowicz et al. |
| 2004/0203981 A1 | 10/2004 | Budka et al. |
| 2004/0218617 A1 | 11/2004 | Sagfors |
| 2004/0223455 A1 | 11/2004 | Fong et al. |
| 2004/0224677 A1 | 11/2004 | Kuchibhotla et al. |
| 2004/0228313 A1 | 11/2004 | Cheng et al. |
| 2004/0233838 A1 | 11/2004 | Sudo et al. |
| 2004/0235510 A1 | 11/2004 | Elicegui et al. |
| 2004/0248518 A1 | 12/2004 | Kashiwase |
| 2004/0248568 A1 | 12/2004 | Lucidarme et al. |
| 2004/0252662 A1 | 12/2004 | Cho et al. |
| 2004/0253996 A1 | 12/2004 | Chen et al. |
| 2004/0258040 A1 | 12/2004 | Joshi et al. |
| 2004/0259546 A1 | 12/2004 | Balachandran et al. |
| 2004/0264414 A1 | 12/2004 | Dorenbosch |
| 2004/0266474 A1 | 12/2004 | Petrus et al. |
| 2005/0003847 A1 | 1/2005 | Love et al. |
| 2005/0008892 A1 | 1/2005 | Yamamoto et al. |
| 2005/0037775 A1 | 2/2005 | Moeglein et al. |
| 2005/0047344 A1 | 3/2005 | Seol et al. |
| 2005/0047393 A1 | 3/2005 | Liu et al. |
| 2005/0047416 A1 | 3/2005 | Heo et al. |
| 2005/0053099 A1 | 3/2005 | Spear et al. |
| 2005/0058637 A1 | 3/2005 | Lynn et al. |
| 2005/0068922 A1 | 3/2005 | Jalali |
| 2005/0099987 A1 | 5/2005 | Lester et al. |
| 2005/0111361 A1 | 5/2005 | Hosein |
| 2005/0111462 A1 | 5/2005 | Walton et al. |
| 2005/0122900 A1 | 6/2005 | Tuulos et al. |
| 2005/0128999 A1 | 6/2005 | Kwon et al. |
| 2005/0135320 A1 | 6/2005 | Tiedemann et al. |
| 2005/0136937 A1 | 6/2005 | Qian et al. |
| 2005/0143084 A1 | 6/2005 | Cheng et al. |
| 2005/0143114 A1 | 6/2005 | Moulsley et al. |
| 2005/0152320 A1 | 7/2005 | Marinier et al. |
| 2005/0157803 A1 | 7/2005 | Kim et al. |
| 2005/0157876 A1 | 7/2005 | Jeong et al. |
| 2005/0170782 A1 | 8/2005 | Rong et al. |
| 2005/0181732 A1 | 8/2005 | Kang et al. |
| 2005/0185632 A1 | 8/2005 | Draves et al. |
| 2005/0195765 A1 | 9/2005 | Sharon et al. |
| 2005/0201331 A1 | 9/2005 | Gaal et al. |
| 2005/0201353 A1 | 9/2005 | Lee et al. |
| 2005/0207335 A1 | 9/2005 | Schmidl et al. |
| 2005/0207359 A1 | 9/2005 | Hwang et al. |
| 2005/0232154 A1 | 10/2005 | Bang et al. |
| 2005/0243938 A1* | 11/2005 | Armstrong et al. ........... 375/260 |
| 2005/0249118 A1 | 11/2005 | Terry et al. |
| 2005/0250509 A1 | 11/2005 | Choksi et al. |
| 2005/0250529 A1 | 11/2005 | Funnell et al. |
| 2005/0259662 A1 | 11/2005 | Kim et al. |
| 2005/0265301 A1 | 12/2005 | Heo et al. |
| 2005/0281232 A1 | 12/2005 | Kim et al. |
| 2005/0281278 A1 | 12/2005 | Black et al. |
| 2005/0289256 A1 | 12/2005 | Cudak et al. |
| 2006/0003767 A1 | 1/2006 | Kim et al. |
| 2006/0015357 A1 | 1/2006 | Cagan |
| 2006/0019694 A1 | 1/2006 | Sutivong et al. |
| 2006/0034174 A1 | 2/2006 | Nishibayashi et al. |
| 2006/0040696 A1* | 2/2006 | Lin ................................ 455/522 |
| 2006/0045013 A1 | 3/2006 | Vannithamby et al. |

(56) References Cited

U.S. PATENT DOCUMENTS

| | | |
|---|---|---|
| 2006/0056346 A1 | 3/2006 | Vadgama et al. |
| 2006/0073836 A1 | 4/2006 | Laroia et al. |
| 2006/0079257 A1 | 4/2006 | Iochi et al. |
| 2006/0079267 A1 | 4/2006 | Kim et al. |
| 2006/0083161 A1 | 4/2006 | Laroia et al. |
| 2006/0089104 A1 | 4/2006 | Kaikkonen et al. |
| 2006/0092881 A1 | 5/2006 | Laroia et al. |
| 2006/0104240 A1 | 5/2006 | Sebire et al. |
| 2006/0126497 A1 | 6/2006 | Na et al. |
| 2006/0128410 A1 | 6/2006 | Derryberry et al. |
| 2006/0133346 A1 | 6/2006 | Chheda et al. |
| 2006/0135193 A1 | 6/2006 | Ratasuk et al. |
| 2006/0140154 A1 | 6/2006 | Kwak et al. |
| 2006/0142032 A1 | 6/2006 | Derakhshan et al. |
| 2006/0164981 A1 | 7/2006 | Olsson et al. |
| 2006/0165029 A1 | 7/2006 | Melpignano et al. |
| 2006/0176807 A1 | 8/2006 | Wu et al. |
| 2006/0182022 A1 | 8/2006 | Abedi |
| 2006/0203765 A1 | 9/2006 | Laroia et al. |
| 2006/0205356 A1 | 9/2006 | Laroia et al. |
| 2006/0205396 A1 | 9/2006 | Laroia et al. |
| 2006/0215604 A1 | 9/2006 | Mueckenheim et al. |
| 2006/0234722 A1 | 10/2006 | Hanebeck et al. |
| 2006/0245452 A1 | 11/2006 | Frederiksen et al. |
| 2006/0246916 A1 | 11/2006 | Cheng et al. |
| 2006/0270399 A1 | 11/2006 | Qi et al. |
| 2006/0285481 A1 | 12/2006 | Lane et al. |
| 2006/0287743 A1 | 12/2006 | Sampath et al. |
| 2007/0002757 A1 | 1/2007 | Soomro et al. |
| 2007/0002806 A1 | 1/2007 | Soomro et al. |
| 2007/0004437 A1 | 1/2007 | Harada et al. |
| 2007/0015541 A1 | 1/2007 | Dominique et al. |
| 2007/0026803 A1 | 2/2007 | Malm |
| 2007/0026808 A1 | 2/2007 | Love et al. |
| 2007/0030828 A1 | 2/2007 | Vimpari et al. |
| 2007/0036116 A1 | 2/2007 | Eiger et al. |
| 2007/0057952 A1 | 3/2007 | Swedberg et al. |
| 2007/0066273 A1 | 3/2007 | Laroia et al. |
| 2007/0070894 A1 | 3/2007 | Wang et al. |
| 2007/0081492 A1 | 4/2007 | Petrovic et al. |
| 2007/0081498 A1 | 4/2007 | Niwano |
| 2007/0104128 A1 | 5/2007 | Laroia et al. |
| 2007/0104164 A1 | 5/2007 | Laroia et al. |
| 2007/0133412 A1 | 6/2007 | Hutter et al. |
| 2007/0140168 A1 | 6/2007 | Laroia et al. |
| 2007/0140179 A1 | 6/2007 | Zhang et al. |
| 2007/0141994 A1 | 6/2007 | Cheng et al. |
| 2007/0147283 A1 | 6/2007 | Laroia et al. |
| 2007/0147377 A1 | 6/2007 | Laroia et al. |
| 2007/0149128 A1 | 6/2007 | Das et al. |
| 2007/0149129 A1 | 6/2007 | Das et al. |
| 2007/0149131 A1 | 6/2007 | Li et al. |
| 2007/0149132 A1 | 6/2007 | Li et al. |
| 2007/0149137 A1 | 6/2007 | Richardson et al. |
| 2007/0149138 A1 | 6/2007 | Das et al. |
| 2007/0149194 A1 | 6/2007 | Das et al. |
| 2007/0149227 A1 | 6/2007 | Parizhsky et al. |
| 2007/0149228 A1 | 6/2007 | Das |
| 2007/0149238 A1 | 6/2007 | Das et al. |
| 2007/0159969 A1 | 7/2007 | Das et al. |
| 2007/0168326 A1 | 7/2007 | Das et al. |
| 2007/0173208 A1 | 7/2007 | Nishio et al. |
| 2007/0183308 A1 | 8/2007 | Korobkov et al. |
| 2007/0213087 A1 | 9/2007 | Laroia et al. |
| 2007/0243882 A1 | 10/2007 | Edge |
| 2007/0249287 A1 | 10/2007 | Das et al. |
| 2007/0249360 A1 | 10/2007 | Das et al. |
| 2007/0253355 A1 | 11/2007 | Hande et al. |
| 2007/0253357 A1 | 11/2007 | Das et al. |
| 2007/0253358 A1 | 11/2007 | Das |
| 2007/0253385 A1 | 11/2007 | Li et al. |
| 2007/0253449 A1 | 11/2007 | Das et al. |
| 2007/0258365 A1 | 11/2007 | Das et al. |
| 2008/0031368 A1 | 2/2008 | Lindoff et al. |
| 2008/0037474 A1 | 2/2008 | Niwano |
| 2008/0051086 A2 | 2/2008 | Etemad et al. |
| 2008/0057969 A1 | 3/2008 | Agami et al. |
| 2008/0076462 A1 | 3/2008 | Iochi et al. |
| 2008/0144521 A1 | 6/2008 | Soomro et al. |
| 2008/0159235 A1 | 7/2008 | Son et al. |
| 2008/0167047 A1 | 7/2008 | Abedi |
| 2009/0004983 A1* | 1/2009 | Darabi .................... 455/130 |
| 2009/0034455 A1 | 2/2009 | Lee et al. |
| 2009/0103507 A1* | 4/2009 | Gu et al. .................. 370/342 |
| 2009/0106507 A1 | 4/2009 | Skerlj et al. |
| 2010/0220626 A1 | 9/2010 | Das et al. |
| 2011/0090812 A1 | 4/2011 | Aoyama |
| 2011/0149789 A1 | 6/2011 | Edge |
| 2013/0230027 A1 | 9/2013 | Das et al. |
| 2013/0242888 A1 | 9/2013 | Das et al. |

FOREIGN PATENT DOCUMENTS

| | | |
|---|---|---|
| CL | 3605-2006 | 12/2006 |
| CN | 1159262 A | 9/1997 |
| CN | 1265792 | 9/2000 |
| CN | 1286832 A | 3/2001 |
| CN | 1316140 | 10/2001 |
| CN | 1335036 A | 2/2002 |
| CN | 1338877 A | 3/2002 |
| CN | 1507708 | 6/2004 |
| CN | 1545252 A | 11/2004 |
| CN | 1604685 | 4/2005 |
| DE | 10162664 | 7/2003 |
| EP | 1037419 A2 | 9/2000 |
| EP | 1037491 | 9/2000 |
| EP | 1 054 518 | 11/2000 |
| EP | 1089500 A2 | 4/2001 |
| EP | 1179962 | 2/2002 |
| EP | 1180881 | 2/2002 |
| EP | 1180907 | 2/2002 |
| EP | 1221273 A1 | 7/2002 |
| EP | 1233637 | 8/2002 |
| EP | 1377100 A2 | 1/2004 |
| EP | 1511245 | 3/2005 |
| EP | 1564953 A2 | 8/2005 |
| EP | 1571762 A1 | 9/2005 |
| EP | 1 594 260 | 11/2005 |
| EP | 1758276 A1 | 2/2007 |
| EP | 1841259 | 10/2007 |
| GB | 2340693 | 2/2000 |
| JP | 8008806 A | 1/1996 |
| JP | 8503591 | 4/1996 |
| JP | 9275582 A | 10/1997 |
| JP | 09307939 | 11/1997 |
| JP | 10022975 A | 1/1998 |
| JP | 10173585 | 6/1998 |
| JP | 11122167 | 6/1998 |
| JP | 2000049689 | 2/2000 |
| JP | 2001007761 A | 1/2001 |
| JP | 2001016152 | 1/2001 |
| JP | 2001510974 | 8/2001 |
| JP | 2001512921 T | 8/2001 |
| JP | 2001251680 A | 9/2001 |
| JP | 2001523901 T | 11/2001 |
| JP | 2001525135 T | 12/2001 |
| JP | 2002077992 | 3/2002 |
| JP | 2002111627 A | 4/2002 |
| JP | 2002262330 A | 9/2002 |
| JP | 2003018641 A | 1/2003 |
| JP | 2003500911 | 1/2003 |
| JP | 2003509983 A | 3/2003 |
| JP | 2003510887 T | 3/2003 |
| JP | 2003244161 | 8/2003 |
| JP | 2004153585 | 5/2004 |
| JP | 2004297284 A | 10/2004 |
| JP | 2004533731 T | 11/2004 |
| JP | 2004350052 A | 12/2004 |
| JP | 2005073276 | 3/2005 |
| JP | 2005130482 | 5/2005 |
| JP | 2005136773 A | 5/2005 |
| JP | 2005142965 A | 6/2005 |
| JP | 2005525730 A | 8/2005 |
| JP | 2005526417 A | 9/2005 |

(56) References Cited

FOREIGN PATENT DOCUMENTS

| | | |
|---|---|---|
| JP | 2005333671 | 12/2005 |
| JP | 2006514735 A | 5/2006 |
| JP | 2006518578 A | 8/2006 |
| JP | 06268574 A | 10/2006 |
| JP | 2006524966 T | 11/2006 |
| JP | 2006526323 A | 11/2006 |
| JP | 2007509531 A | 4/2007 |
| JP | 2007514364 A | 5/2007 |
| JP | 2007514378 T | 5/2007 |
| JP | 2007522692 A | 8/2007 |
| JP | 2007525044 A | 8/2007 |
| JP | 2007525045 T | 8/2007 |
| JP | 2011045054 | 3/2011 |
| KR | 1019990084525 | 12/1999 |
| KR | 20010014223 | 2/2001 |
| KR | 20040018526 | 3/2004 |
| KR | 20040053859 A | 6/2004 |
| KR | 20040084599 A | 10/2004 |
| KR | 20040110044 A | 12/2004 |
| KR | 20050021083 | 3/2005 |
| KR | 20050023187 A | 3/2005 |
| KR | 20050039376 A | 4/2005 |
| KR | 20050099633 | 10/2005 |
| KR | 1020050121274 | 12/2005 |
| KR | 20060012282 A | 2/2006 |
| RU | 2149518 | 5/2000 |
| RU | 2181529 | 4/2002 |
| RU | 2188506 | 8/2002 |
| RU | 2202154 | 4/2003 |
| TW | 200423642 | 11/2004 |
| WO | WO9623371 A1 | 8/1996 |
| WO | WO9845967 A2 | 10/1998 |
| WO | WO9856120 A2 | 12/1998 |
| WO | 9907090 A1 | 2/1999 |
| WO | 9909779 A1 | 2/1999 |
| WO | WO9913600 A1 | 3/1999 |
| WO | WO9959254 A2 | 11/1999 |
| WO | WO0101610 A1 | 1/2001 |
| WO | 0122759 A1 | 3/2001 |
| WO | WO0135548 A1 | 5/2001 |
| WO | WO0182504 | 11/2001 |
| WO | 0233841 | 4/2002 |
| WO | WO0232183 A1 | 4/2002 |
| WO | WO0239760 A2 | 5/2002 |
| WO | WO0249305 | 6/2002 |
| WO | WO02073831 A1 | 9/2002 |
| WO | 02104058 | 12/2002 |
| WO | WO02101941 A2 | 12/2002 |
| WO | WO03094544 A1 | 11/2003 |
| WO | WO03105498 A1 | 12/2003 |
| WO | 2004077685 | 9/2004 |
| WO | 2004077728 A2 | 9/2004 |
| WO | 2004084503 | 9/2004 |
| WO | WO2004084452 | 9/2004 |
| WO | 2004100450 | 11/2004 |
| WO | 2004110081 | 12/2004 |
| WO | WO2004105420 A1 | 12/2004 |
| WO | 2005020490 | 3/2005 |
| WO | WO2005034438 | 4/2005 |
| WO | 2005060132 | 6/2005 |
| WO | 2005060271 | 6/2005 |
| WO | 2005060277 | 6/2005 |
| WO | WO2005057812 A1 | 6/2005 |
| WO | 2005065056 | 7/2005 |
| WO | WO2005069519 | 7/2005 |
| WO | WO2005125049 A1 | 12/2005 |
| WO | 2006044718 | 4/2006 |
| WO | 2006075293 | 7/2006 |
| WO | 2007031956 | 3/2007 |

OTHER PUBLICATIONS

Written Opinion, PCT/US06/048513, International Search Authority, European Patent Office, Feb. 4, 2008.

International Preliminary Report on Patentability, PCT/US06/048513, The International Bureau of WIPO, Geneva, Switzerland, Jun. 24, 2008.

Hosein, et al., "Optimal Assignment of Mobile Station Serving Sector for the Forward Link of a Time-Shared Wireless Packet Data Channel," Fifth IEE International Conference on 3G Mobile Communication Technologies (3G 2004), Oct. 18-20, 2004, pp. 654-658.

Kwon, et al., "Quasi-Dedicated Access Scheme for Uplink Realtime Services in Future Wireless Communication Systems," Vehicular Technology Conference, 2005. VTC 2005—Spring. 2005 IEEE 61st Stockholm, Sweden, Apr. 20-May 1, 2005, Piscataway, NJ, USA, May 30, 2005, pp. 3117-3121.

Majmundar, "Impact of Mobile-Originated Short Message Service on the Digital Control Channel of TDMA Systems," Vehicular Technology Conference, 2000. IEEE VTS Fall VTC 2000 52nd Sep. 24-28, 2000, Piscataway, NJ, USA, IEEE, Sep. 24, 2000, pp. 1550-1555.

Gunnarson, F. et al.: "Uplink Admission Control in WCDMA Based on Relative Load Estimates", IEEE International Conference on Communications, vol. 1, pp. 3091-3095, IEEE, New York, NY USA (Apr. 28, 2002).

Gunnarson, F., et al.: "Uplink Admission Control in WCDMA Based on Relative Load Estimates", IEEE International Conference on Communications, vol. 1, pp. 3091-3095, IEEE, New York, NY USA (Apr. 28, 2002).

Wada, "Study of an OFDM Cellular System Using a Single Band," 2002 Communication Society Convention, Collection of Lecture Papers 1, Japan, IEEE, Aug. 20, 2002, p. 355, B-5-58.

IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 1-356, Sep. 2004.

IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 184-190, Sep. 2004.

Hang Zhang et al, "Clean up for Closed-Loop MIMO in H-ARQ MAP IE", IEEE P802.16e/D7 Broadband Wireless Access Working Group <http://ieee802.org/16>, pp. 1-6, Mar. 10, 2010.

Taiwanese Search report—095137980—TIPO—Oct. 13, 2010.

3GPP, Radio Resource Control (RRC) protocol specification (3GPP TS 25.331 version 6.3.0 Release 6), ETSI TS 125 331, ETSI, Sep. 2004, V6.3.0, p. 49, 202-209, 220, 221, 406, 579-585, 589, 930.

Ericsson, Discussion on SIR Measurement, TSG-RAN Working Group 4 (Radio) meeting #18, 3GPP, Jul. 9, 2001, R4-010895, URL, http://www.3gpp.org/ftp/tsg_ran/WG4_Radio/TSGR4_18/Docs/R4-010895.zip.

Supplementary European Search Report—EP04713438, Search Authority—The Hague Patent Office, Nov. 30, 2010.

TIM/TILAB, BIU, Mobilkom Austria, One2one,Telefonica, Re-introduction of SIR measurement, 3GPP TSG-RAN4 Meeting #17,3GPP, May 21, 2001, R4-010647, URL, http://www.3gpp.org/ftp/tsg_ran/WG4_Radio/TSGR4_17/Docs/R4-010647.Zip.

Translation of Office Action in Chinese application 200680047991.2 corresponding to U.S. Appl. No. 11/608,785, citing CN1604685 dated Dec. 31, 2010.

Translation of Office Action in Japan application 2008-535788 corresponding to U.S. Appl. No. 11/549,604, citing WO2005060277, WO200534438, US20050099987, JP2004350052, JP09307939 and US20050136937 dated Jan. 4, 2011.

Translation of Office Action in Japan application 2008-547460 corresponding to U.S. Appl. No. 11/333,771, citing WO2005125049 and JP2001007761 dated Mar. 15, 2011.

Translation of Office Action in Japan application 2010-275603 corresponding to U.S. Appl. No. 11/251,069, citing JP2003018641A, 3GPP_ETSI_TS_125_331_year_2004, TIM/TILAB_R4-010647_year_2001 and Ericsson_R4_010895_year_2001 dated Feb. 8, 2011.

Translation of Office Action in Japanese application 2008-535738 corresponding to U.S. Appl. No. 11/486,714, citing JP2007514378, JP2003510887 and WO9623371 dated Nov. 16, 2010.

(56) References Cited

OTHER PUBLICATIONS

Translation of Office Action in Japanese application 2008-535789 corresponding to U.S. Appl. No. 11/549,611, citing JP2003244161, JP200277992 and JP2001016152 dated Jan. 18, 2011.
Translation of Office Action in Ukraine application 200508984 corresponding to U.S. Appl. No. 11/748,433, citing US20020160802, WO0232183, RU2181529, WO9845967, EP1377100, US5867478, US20010007552, US6035000 and US5933421 dated Dec. 9, 2010.
Translation of Office Action in Ukraine Application 201010406 corresponding to U.S. Appl. No. 11/748,433, citing US5867478, US20010007552, US6035000, US5933421, WO02073831, WO02032183, RU2181529 and EP1377100 dated Feb. 22, 2011.
Taiwan Search Report—TW095148272—TIPO—Feb. 25, 2013.
3GPP TSG RAN2#45bis. "EDCH Buffer Status Reporting," R2-050026, Sophia Antipolis, France, Jan. 10-14, 2005, URL: http://www.3gpp.org/ftp/tsg_ran/WG2_RL2/TSGR2_45bis/Dcs/R2-050026.zip.
3GPP TSG-RAN WG2 meeting #48. "Scheduling Information Contents," R2-051957, London, United Kingdom, Aug. 29, 2005, URL: http://3gpp.org/ftp/tsg_ran/WG2_RL2/TSGR2_48/Docments/R2-095517.zip.
Chang, Cheng-Ta: "Downlink Transmit Power Issues in a WCDMA Cellular System," Dec. 14, 2004, p. 3, Fig. 1, Retrieved online: http://wintech.ee.nctu.edu.tw/handoff/MediaTek/Material/Wintech/1214/Downlink%20Transmit%20Power%20Issues%20in%20a%20WCDMA%20Cellular%20System.pdf.
Gunnarsson, G. et al., "Location Trial System for Mobile Phones," Global Telecommunications Conference, 1998, GLOBECOM 98. The Bridge to Global Integration. IEEE, vol. 4, pp. 2211-2216, Nov. 8-12, 1998.
Hobfeld, T. et al,, "Supporting Vertical Handover by Using a Pastry Peer-to-Peer Overlay Network," Fourth Annual IEEE International Conference on Pervasive Computing and Communications Workshops, 2006. Percom Workshops 2006, Mar. 13-17, 2006, pp. 163-167, p. 164, paragraph III, IEEE, Piscataway, NJ, USA, XP010910514, ISBN: 0-7695-2520-2.
LG Electronics Inc., "Relative Buffer Status Reporting," 3GPP TSG-RAN WG2 meeting #46bis, R2-050852, Apr. 4, 2005, pp. 1-3, URL, http://www.3gpp.org/ftp/tsg_ran/WG2_RL2/TSGR2_46bis/Docurnents/R2-050852.zip.
Samsung: "Uplink control signaling structure (Revision of R1-041086)," 3GPP TSG-RAN WG1 Meeting #38bis, Tdoc R1-041222, 3GPP, Sep. 20, 2004, URL:http://www.3gpp.org/ftp/tsg_ran/WG1_RL1/TSGR1_38bis/Dcs/R1-041222.zip.
European Search Report—EP10175460—Search Authority—Berlin—Oct. 11, 2010.

\* cited by examiner

METHODS AND APPARATUS FOR GENERATING, COMMUNICATING, AND/OR USING INFORMATION RELATING TO SELF-NOISE

RELATED APPLICATIONS

The present application claims the benefit of U.S. Provisional Patent Application Ser. No. 60/752,973, filed on Dec. 22, 2005, titled "COMMUNICATIONS METHODS AND APPARATUS", which is hereby expressly incorporated by reference and is a continuation-in part of U.S. patent application Ser. No. 10/648,766, filed Aug. 25, 2003 which issued as U.S. Pat. No. 7,218,948 which claims the benefit of U.S. Provisional Patent Application Ser. No. 60/449,729 filed Feb. 24, 2003; and is also a continuation-in-part of U.S. patent application Ser. No. 10/648,767, filed Aug. 25, 2003 which claims the benefit of U.S. Provisional Patent Application Ser. No. 60/449,729 filed Feb. 24, 2003.

FIELD OF THE INVENTION

The present invention relates to methods and apparatus of wireless signaling and, more particularly, to methods and apparatus for generating, transmitting, and/or using a report relating to and/or providing self noise information.

BACKGROUND

In cellular wireless systems, base stations often need to communicate user data/information to multiple wireless terminals simultaneously. In the downlink, the link from the base station (BS) to the wireless terminals (WTs), an important problem is the allocation of base station transmitter power to the different WTs being served simultaneously by the same BS. Each BS typically has a total transmit power budget available for all downlink communication, and this power is typically shared amongst the WTs. The base station transmitter power allocated to a WT in the cell will influence the WT's received signal-to-noise ratio (SNR), which in turn affects the downlink data rate that the wireless communications link from the base station to the WT can support. In this way, the power allocation can be used to adjust the downlink data rate to different WTs depending on their traffic needs and channel conditions.

One wireless system where this power allocation problem arises is a multiple user orthogonal frequency division multiplexing (OFDM) wireless communications system supporting concurrent transmission of different downlink user data to different wireless terminals sourced from the same base station transmitter.

One problem in realizing the potential of the multiple access OFDM downlink, is that a base station needs to perform appropriate power allocation. For any assigned data rate option of a downlink traffic segment, the BS needs to correctly allocate enough transmitter power for that segment to be received reliably at the intended WT. If too little power is allocated, the decoding of the segment will likely fail and need re-transmission. If the power allocated for is excessive, it means that power was wasted and that wasted power could have been used for the other WTs being serviced by the base station.

Ideally, each data rate option that can be used for downlink traffic communication has a corresponding minimum received SNR requirement, and ideally the received SNR will scale linearly with the received power. Consequently, under ideal circumstances, the WT could measure the SNR at a single reference signal level, and then report that SNR back to the BS. Knowing that the SNR scales linearly with the power, assuming an ideal case, for any scheduled data rate option, the base station could adjust the transmit power relative to the reference signal to insure that the segment is received with the correct SNR for that data rate.

However, in practice, the WT receiver processing introduces errors, such as channel estimation inaccuracies, phase jitter, and timing and frequency offsets. These errors typically scale with the received power, and effectively add a signal-dependent component to the noise. This noise component is sometimes called "self-noise," to distinguish it from external and thermal noise that is independent of the signal processing. In the presence of self-noise, the received SNR no longer scales linearly with the received power. In particular, as the received power is increased, the SNR eventually saturates at a maximum level depending on the self-noise.

In the presence of self-noise, the WT can no longer simply report the SNR at a single power level and expect the base station to be able to determine correct transmit power corresponding to different data rate options. From a single SNR measurement, the BS cannot separate the self-noise and external noise components, and therefore, cannot accurately extrapolate the power required to obtain any other SNR.

The problem of self-noise is particularly important in recently developed wireless technologies which offer high downlink data rates. These systems offer rates at high SNRs (often in excess of 20 dB) where the self-noise component can be significant. Also, as these services are to be offered in mobile, fading environments, or in long range applications with significant delay spread, the self-noise component will become more pronounced. It is thus important that the BS can properly select its transmit power corresponding to different downlink traffic channel segments to account for self-noise.

Consequently, there is a need in wireless communications systems for methods and apparatus directed to the measurement, determination, reporting, and/or use of wireless terminal self-noise information.

SUMMARY OF THE INVENTION

The present invention is directed to methods and apparatus to methods and apparatus for generating, transmitting, and/or using a report relating to and/or providing self noise information.

One exemplary method of operating a wireless terminal in accordance with the invention includes determining a downlink signal to noise ratio saturation level and transmitting, e.g., using OFDM signaling, the determined signal to noise ratio saturation level to a base station. In various embodiments, a quantized value is transmitted to represent the determined signal to noise saturation level. In some embodiments the quantized value is transmitted using a dedicated control channel segment allocated to the wireless terminal but it may be transmitted in other ways instead. The dedicated control channel segment may be a segment reserved to convey a signal to noise ratio saturation level report during each iteration of a recurring predetermined uplink timing structure. As another example, the dedicated control channel segment may be a segment reserved for use by the wireless terminal, in which the wireless terminal selects to convey a signal to noise ratio saturation level report or another report, e.g., an uplink traffic channel request report. One particular exemplary signal to noise ratio level saturation level report conveys 4 information bits with the bit pattern being set to one of sixteen patterns, each corresponding to a different quantization level. In some embodiments, but not necessarily all embodiments, the downlink signal to noise ratio saturation level is a downlink signal to noise ratio that a wireless terminal would measure on a received signal that was transmitted by a base station at infinite power if the wireless terminal were capable of receiving and processing such a signal. In various exemplary embodiments, the downlink signal to noise ratio saturation level is a function of wireless terminal self-noise. In some exemplary embodiments, determining the downlink signal to noise ratio saturation level is based on measured channel estimation errors. In the same or other embodiments, determining the downlink signal to noise ratio saturation level is based on at least one receiver characteristic, e.g., receiver filter type, amplifier type, analog to digital converter sampling rate.

In some particular exemplary embodiments, determining a downlink signal to noise ratio saturation level includes measuring the received power of a tone corresponding to a NULL base station output to thereby determine an interference power (N), measuring the received power of a pilot signal ($GP_0$), determining the signal to noise ratio of the received pilot signal ($SNR_0$), and calculating the downlink signal to noise ratio saturation level, e.g., using the equation: downlink signal to noise ratio saturation level=$(1/SNR_0 - N/(GP_0))^{-1}$.

The present invention is directed to, among other things, a method of operating a first communications device, e.g., a wireless terminal, including a receiver operating in the presence of self-noise. In one embodiment the method includes receiving first and second signals from a second communications device, e.g., a base station, said first and second signals having been transmitted at first and second power levels, said first and second power levels being different; performing a first noise measurement on the first received signal; performing a second noise measurement of the second received signal; and communicating noise measurement information corresponding to the first and second received signals to the second communications device. In some embodiments, the communicated information provides information indicating how a SNR at the receiver varies as a function of the transmit power of the second device. This allows the second communications device to know or determine the self-noise saturation SNR level of the first communications device.

While various embodiments have been discussed in the summary above, it should be appreciated that not necessarily all embodiments include the same features and some of the features described above are not necessary in some embodiments. Numerous additional features, embodiments and benefits of the present invention are discussed in the detailed description which follows.

DETAILED DESCRIPTION OF THE INVENTION

Figure 1:
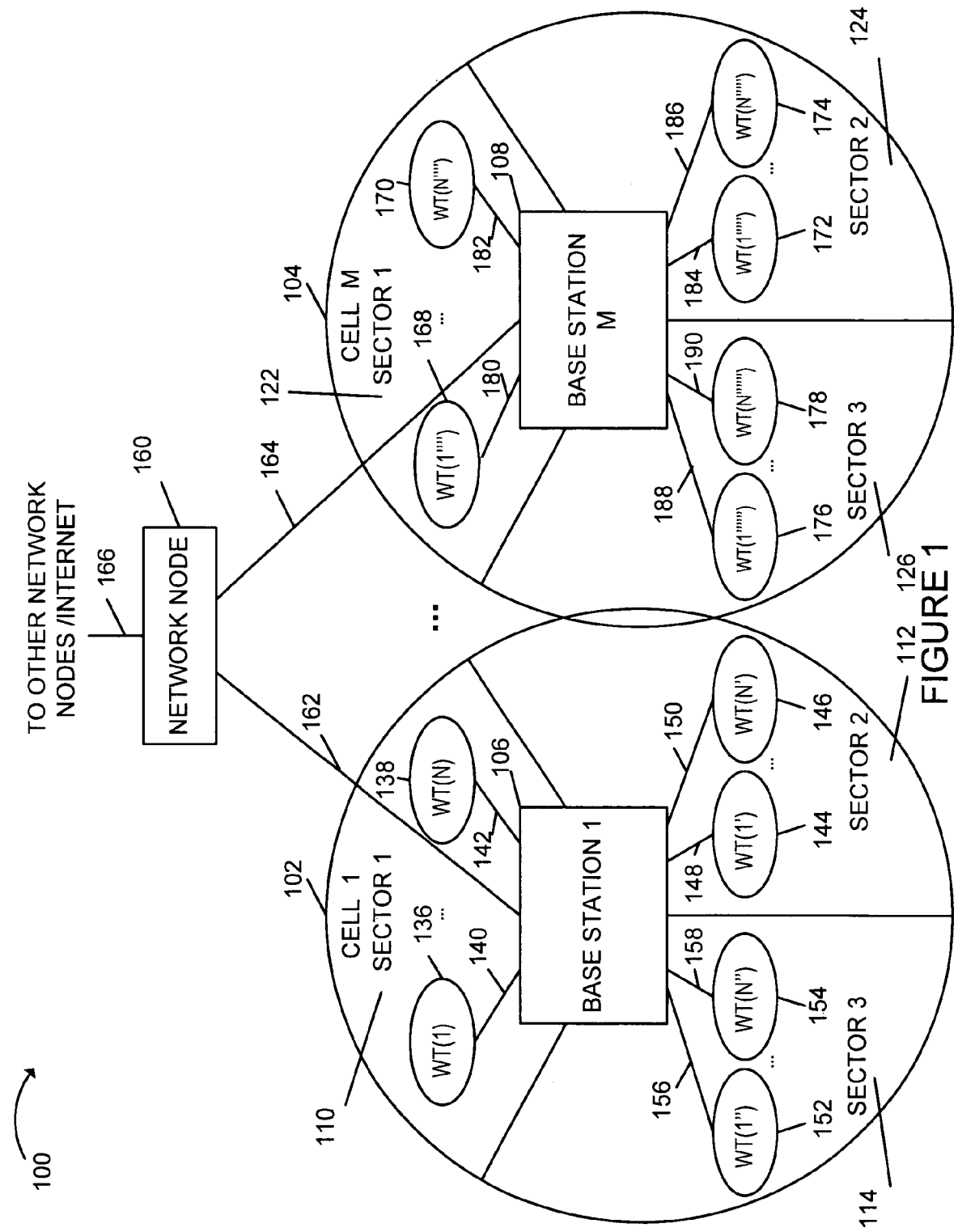
FIG. 1 is a drawing of an exemplary wireless communications system implemented in accordance with the present invention.

FIG. 1 shows an exemplary communication system 100 implemented in accordance with the present invention including multiple cells: cell 1 102, cell M 104. Exemplary system 100 is, e.g., an exemplary OFDM spread spectrum wireless communications system such as a multiple access OFDM system. Each cell 102, 104 of exemplary system 100 includes three sectors. Cells which have not be subdivided into multiple sectors (N=1), cells with two sectors (N=2) and cells with more than 3 sectors (N>3) are also possible in accordance with the invention. Each sector supports one or more carriers and/or downlink tones blocks. In some embodiments at least some of the sectors support three downlink tones blocks. In some embodiments, each downlink tone block is associated with a corresponding uplink tone block. Cell 102 includes a first sector, sector 1 110, a second sector, sector 2 112, and a third sector, sector 3 114. Similarly, cell M 104 includes a first sector, sector 1 122, a second sector, sector 2 124, and a third sector, sector 3 126. Cell 1 102 includes a base station (BS), base station 1 106, and a plurality of wireless terminals (WTs) in each sector 110, 112, 114. Sector 1 110 includes WT(1) 136 and WT(N) 138 coupled to BS 106 via wireless links 140, 142, respectively; sector 2 112 includes WT(1') 144 and WT(N') 146 coupled to BS 106 via wireless links 148, 150, respectively; sector 3 114 includes WT(1") 152 and WT(N") 154 coupled to BS 106 via wireless links 156, 158, respectively. Similarly, cell M 104 includes base station M 108, and a plurality of wireless terminals (WTs) in each sector 122, 124, 126. Sector 1 122 includes WT(1''') 168 and WT(N''') 170 coupled to BS M 108 via wireless links 180, 182, respectively; sector 2 124 includes WT(1'''') 172 and WT(N'''') 174 coupled to BS M 108 via wireless links 184, 186, respectively; sector 3 126 includes WT(1"41 ") 176 and WT(N''''') 178 coupled to BS M 108 via wireless links 188, 190, respectively.

System 100 also includes a network node 160 which is coupled to BS1 106 and BS M 108 via network links 162, 164, respectively. Network node 160 is also coupled to other network nodes, e.g., other base stations, AAA server nodes, intermediate nodes, routers, etc. and the Internet via network link 166. Network links 162, 164, 166 may be, e.g., fiber optic cables. Each wireless, e.g. WT 1 136, includes a transmitter as well as a receiver. At least some of the wireless terminals, e.g., WT(1) 136, are mobile nodes which may move through system 100 and may communicate via wireless links with the base station in the cell in which the WT is currently located, e.g., using a base station sector attachment point. The wireless terminals, (WTs), e.g. WT(1) 136, may communicate with peer nodes, e.g., other WTs in system 100 or outside system 100 via a base station, e.g. BS 106, and/or network node 160. WTs, e.g., WT(1) 136 may be mobile communications devices such as cell phones, personal data assistants with wireless modems, etc.

Each base station (106, 108) performs downlink signaling, in accordance with the invention, e.g., with each of its base station transmitters transmitting intentional null tones, downlink pilot tones, assignment information, and downlink traffic channel signals. Each base station (106, 108) receives and processes uplink signals in accordance with the present invention, e.g., including uplink dedicated control channel signals including downlink saturation level of self-noise signal to noise ratio reports.

Figure 2:
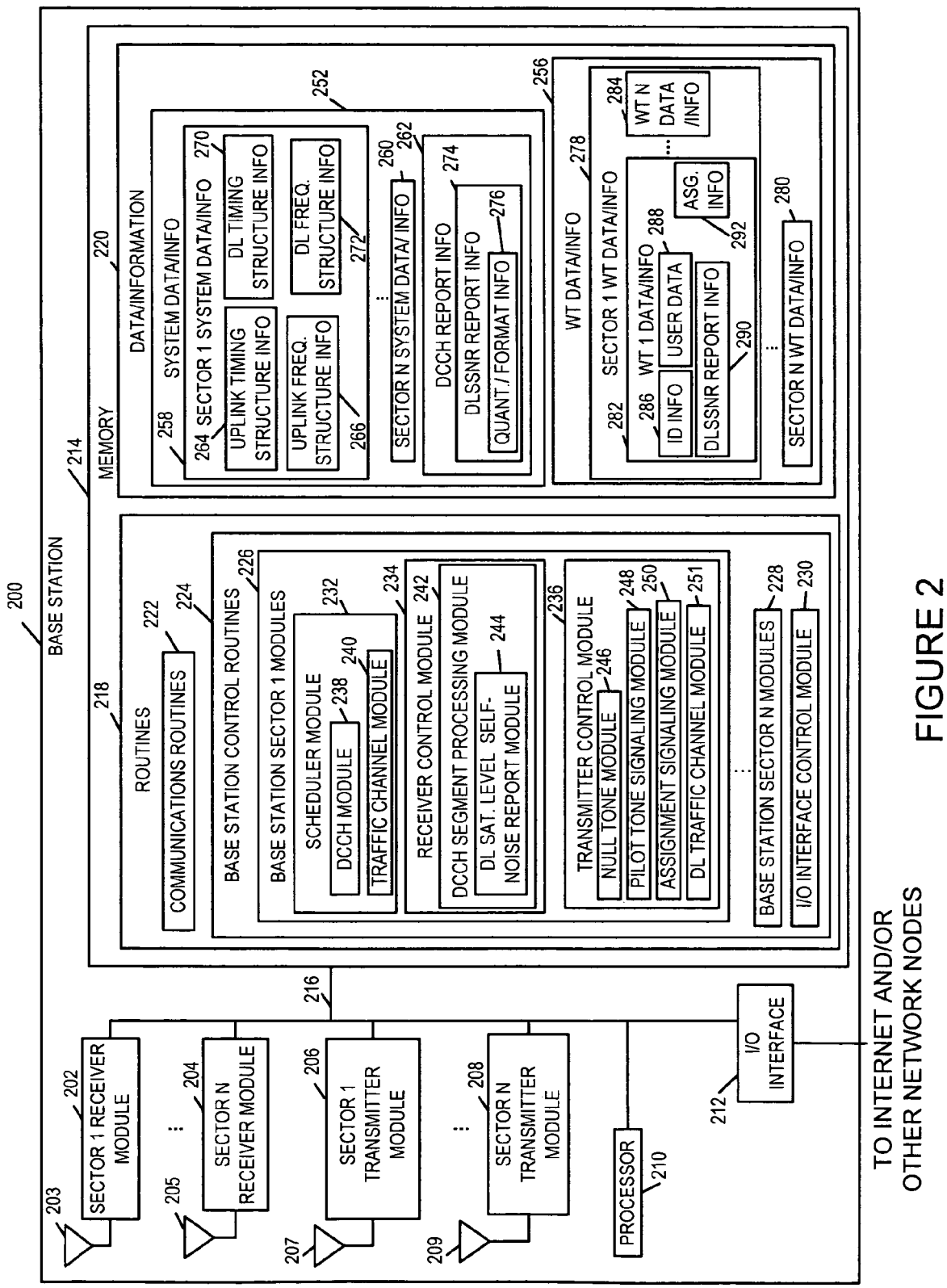
FIG. 2 is a drawing of an exemplary base station implemented in accordance with the present invention.

FIG. 2 is a drawing of an exemplary base station 200, e.g., access node, implemented in accordance with the present invention and using methods of the present invention. Exemplary BS 200 may be any of the BSs (106, 108) of the exemplary system 100 of FIG. 1. Exemplary base station 200 includes one or more base station sector receiver modules (sector 1 receiver module 202, . . . , sector N receiver module 204) and one or more base station sector transmitter modules (sector 1 transmitter module 206, . . . , sector N transmitter module 208). Each base station sector receiver module (202, 204) is coupled to a sector receive antenna (203, 205), respectively, via which the base station receives uplink signals from wireless terminals, e.g., wireless terminals connected to a base station sector attachment point. The uplink signals include dedicated control channel segment reports including downlink saturation level of self-noise SNR reports. Each base station sector transmitter module (206, 208) is coupled to a sector transmitter antenna (207, 209), respectively, via which the base station transmits downlink signals including intentional cell and sector null signals and pilot signals. In some embodiments, for a given sector, the same antenna is used for receiver and transmitter.

Exemplary base station 200 also includes a processor 210, an I/O interface 212, and a memory 214. The various elements (202, 204, 206, 208, 210, 212, 214) are coupled together via a bus 216 over which the various elements may interchange data and information. I/O interface 212 couples the base station 200 to the Internet and/or other network nodes, e.g., other base stations, AAA server nodes, home agent nodes, routers, etc. Memory 214 includes routines 218 and data/information 220. The processor 210, e.g., a CPU, executes the routines 218 and uses the data/information 220 in memory 214 to control the operation of the base station and implement the methods of the present invention.

Routines 218 include communications routines 222 and base station control routines 224. The communications routines 222 implement the various communications protocols used by the base station 200. Base station control routines 224 include one or more sets of base station sector modules (base station sector 1 modules 226, . . . , base station sector N modules 228) corresponding to the sectors of the base station and an I/O interface control module 230. I/O interface control module 230 controls the operation of I/O interface 212, e.g., facilitating communications with other base stations in the wireless communications system via a backhaul network.

Base station sector 1 modules 226 include a scheduler module 232, a receiver control module 234 and a transmitter control module 236. Scheduler module 232 performs scheduling of wireless terminals with respect to sector 1. Scheduler module 232 includes a dedicated control channel module 238 and a traffic channel module 240. Dedicated control channel module 238 assigns identification information, e.g., active user identifiers, to wireless terminals which are using a base station 200 sector 1 attachment point. Traffic channel module 240 schedules uplink and/or downlink traffic channel segment to wireless terminals using a base station 200 sector 1 attachment point, e.g., based on amounts of information to be communicated, requests, priority information, and/or reports received from the wireless terminals including downlink saturation level self-noise SNR reports.

Receiver control module 234 controls the operation of sector 1 receiver module 202. Receiver control module 234 includes a dedicated control channel segment processing module 242, which processes received dedicated control channel segments extracting the various reports being communicated by the wireless terminals. DCCH segment processing module 242 includes a downlink saturation level self-noise report module 244 which recovers downlink saturation level self-noise report information from DCCH segments and associates the information with a particular wireless terminal.

Transmitter control module 236 control the operation of sector 1 transmitter module 206. Transmitter control module 236 includes a null tone module 246, a pilot tone signaling module 248, an assignment signaling module 250, and a downlink traffic channel segment module 251. Null tone module 246 controls the sector 1 transmitter module 206 to intentionally refrain from transmitting on predetermined tones in the downlink timing structure at predetermined times within a recurring downlink timing structure being used by the base station sector 1 transmitter, e.g., thus facilitating WT interference measurements. Pilot tone signaling module 248 control the sector 1 transmitter module 206 to generate and transmit pilot tone signals on predetermined tones in the downlink timing structure at predetermined times within a recurring downlink timing structure being used by the base station sector 1 transmitter. A wireless terminal receiving the pilot tones and the intentional null tones can perform a measurement of downlink saturation level SNR. Assignment signaling module 250 controls the sector 1 transmitter module 206 to generate and transmit assignment signals to wireless terminals including, e.g., assignment of active user identifiers associated with DCCH segments, assignments of downlink traffic channel segments, and assignments of uplink traffic channel segments. Downlink traffic channel segment module 251 controls the sector 1 transmitter module 206 to control the generation and/or transmission of downlink traffic channel segment signals. In some embodiments, the downlink traffic channel segment module 251 adjusts the power level and/or data rate associated with a downlink traffic channel segment as a function of received downlink self-noise saturation level SNR information from the wireless terminal to which the downlink traffic segment signals are being communicated.

Data/information 220 includes system data/information 252 and wireless terminal data/information 256. System data/information 252 includes one or more sets of sector information (sector 1 system data/information 258, . . . , sector N system data/information 260) and dedicated control channel report information 262. Sector 1 system data/information 258 includes uplink timing structure information 264, uplink frequency structure information 266, downlink timing structure information 270, and downlink frequency structure information 272. DCCH report information 262 includes information corresponding to the various types of reports which may be communicated by a wireless terminal to BS 200 using dedicated control channel segments, encoding and modulation methods used, information bit allocation within DCCH segment to reports, reports' format, quantization levels associated with reports, and information bit interpretations associated with reports. DCCH report information 262 includes downlink saturation level self-noise SNR report information 274 which includes quantization and format information 276. For example, an exemplary DLSSNR report conveys four information bits representing one of 16 possible quantized levels, and information 276 includes information associating each of the 16 possible bit patterns with a different value.

Wireless terminal data/information 256 includes one or more sets of WT data information (sector 1 WT data/information 278, . . . , sector N WT data/information 280). Sector 1 WT data/information 278 includes a plurality of sets of WT data/information (WT 1 data/information 282, . . . , WT N data/information 284). WT 1 data/information 282 includes identification information 286, user data 288, downlink saturation level self-noise SNR report information 290, and assignment information 292. Identification information includes base station assigned identifiers, e.g., a base station assigned wireless terminal registered user identifier and a base station assigned wireless terminal active user identifier. In some embodiments, the base station assigned active user identifier is associated with dedicated control channel uplink segments to be used by the wireless terminal to communicate reports including downlink self-noise saturation level SNR reports. Downlink saturation level self-noise SNR report information 290 includes a set of information bits corresponding to a received DLSSNR report and a corresponding communicated saturation level recovered by module 244 from the received report using information 274. Assignment information 292 includes assignment information corresponding to assigning identifiers to WT 1, e.g., an active user identifier, assignment information corresponding to assigning downlink traffic channel segments to WT1, and assignment information corresponding to assigning uplink traffic channel segments to WT1. User data 288, e.g., voice data, image data, text data, file data, includes information communicated as part of a communication session between WT 1 and another WT, and is communicated via uplink and/or downlink traffic channel segments allocated to WT1.

Figure 3:
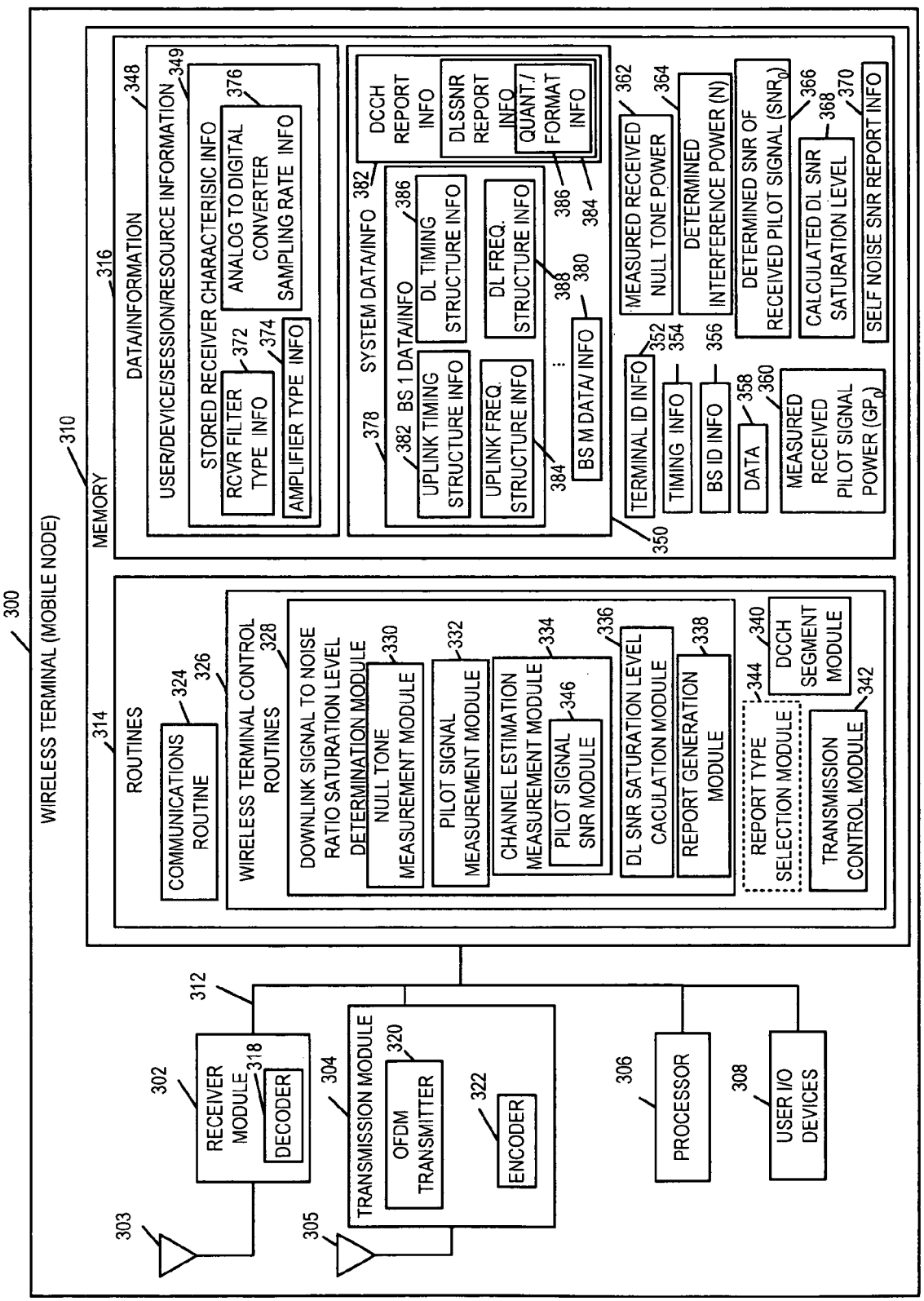
FIG. 3 is a drawing of an exemplary wireless terminal implemented in accordance with the present invention.

FIG. 3 is a drawing of an exemplary wireless terminal 300, e.g., mobile node, implemented in accordance with the present invention and using methods of the present invention. Exemplary WT 300 may be any of the WTs (136, 138, 144, 146, 152, 154, 168, 170, 172, 174, 176, 178) of the exemplary system 100 of FIG. 1. Exemplary wireless terminal 300 includes a receiver module 302, a transmission module 304, a processor 306, user I/O devices 308, and a memory 310 coupled together via a bus 312 over which the various elements may interchange data and information. The memory 310 includes routines 314 and data/information 316. The processor 306, e.g., a CPU, executes the routines 314 and uses the data/information 316 in memory 310 to control the operation of the wireless terminal 300 and implement methods of the present invention.

Receiver module 302 is coupled to receive antenna 303 via which the wireless terminal receives downlink signals from base stations. The received downlink signals include pilot tones signals, intentional null tone signals, assignment signals, control information signals, and downlink traffic channel signals. Receiver 302 includes a decoder 318 for decoding received signals which were encoded by a base station prior to transmission.

Transmission module 304 is coupled to transmit antenna 305 via which the wireless terminal 300 transmits uplink signals to base stations. The transmitted uplink signals include dedicated control channel segment signals including DL self-noise SNR saturation level reports, uplink traffic channel segment signals, and uplink access signals. Transmission module 304 includes an OFDM transmitter 320 and an encoder 322. The transmitter 320 transmits OFDM symbols using a set of uplink tones. Encoder 322 encodes at least some of the information to be communicated via the uplink. In various embodiments, the same antenna is used for the receiver module 302 and transmission module 304.

User I/O devices 308, e.g., microphone, speaker, keypad, keyboard, display, switches, camera, etc., allow a user to input and output user data, select functions, and perform operations, e.g., initiate a communications session.

Routines 314 include a communications routine 324 and wireless terminal control routines 326. The wireless terminal control routines 326 include a downlink signal to noise ratio saturation level determination module 328, a dedicated control channel segment module 340, and a transmission control module 342.

Communications routine 324 implements the various protocols used by the wireless terminal 300. The wireless terminal control routines 326 control the operation of the wireless terminal 300 including control of the receiver module 302, control of the transmission module 304 and control of user I/O devices 308.

Downlink signal to noise ratio saturation level determination module 328 includes a null tone measurement module 330, a pilot signal measurement module 332, a channel estimation measurement module 334, a downlink SNR saturation level calculation module 336, and a report generation module 338. Null tone measurement module 330 measures the received power of tones corresponding to intentional base station NULL output, in the timing/frequency downlink structure being used by the base station transmitter, to thereby determine an interference power N. For example, the intentional NULL tones may correspond to cell NULL segments and/or sector NULL segments in an exemplary downlink timing and frequency structure being used by the base station sector transmitter. Pilot signal measurement module 332 measures the received power of pilot signals ($GP_0$) from the base station sector transmitter corresponding to a current connection, the pilot signals being having known modulation symbol values and being transmitted at known power levels, thus facilitating channel estimation. Channel estimation measurement module 334 measures channel estimation errors which are used in determining the signal to noise ratio saturation level. The channel estimation module 334 includes a pilot signal SNR module 346 which determines the signal to noise ratio of received pilot signals ($SNR_0$). Downlink SNR saturation level calculation module 336 calculates the downlink SNR saturation level, e.g., using the formula DL SNR saturation level=$(1/SNR_0 - N/(GP_0))^{-1}$. Report generation module 338 generates a downlink saturation level self-noise SNR report by comparing the calculated SNR saturation level from the output of module 336 to a plurality of quantized levels that can be represented by the 4 bits of the report and selecting the quantized level closest to the calculated level.

DCCH segment module 340 maps a plurality of different control channel reports including DL saturation level self-noise SNR reports to dedicated control channel segments allocated to the wireless terminal in accordance with uplink timing and frequency structure information associated with the base station attachment point to which the uplink segment is directed. For example, some exemplary dedicated control channel segments dedicated to the wireless terminal, are reserved to communicate a 4 information bit DL saturation level self-noise SNR report, a 1 bit reserved report, and a 1 bit uplink request report. Transmission control module 342 controls, as a function of uplink timing structure information, when the transmission module 304 transmits the determined DL saturation level self-noise SNR report conveying the DL SNR saturation level determination information.

In some embodiment, e.g., where the wireless terminal has the ability to decide which report is placed in at least some dedicated control channel segments allocated to the wireless terminal, the wireless terminal control routines 326 also include a report type selection module 344. For example, in such an embodiment, for some dedicated control channel reports within the reporting structure the wireless terminal may select between a DL saturation level self-noise signal to noise ratio report and other types of reports such as, e.g., an uplink traffic request report.

Data/information 316 includes user/device/session/resource information 348, system data/information 350, terminal identification information 352, timing information 354, base station identification information 356, data 358, measured received pilot signal power ($GP_0$) 360, measured received NULL tone power 362, determined interference power (N) 364, determined SNR of received pilot signal ($SNR_0$) 366, calculated DL SNR saturation level 368, and downlink saturation level self-noise SNR report information 370.

User/device/session/resource information 348 including information corresponding to communications sessions, e.g. peer node identification information, addressing information, routing information, authentication information, etc., information pertaining to air link resources allocated to WT 300, e.g., DCCH segments, uplink traffic channel segment, downlink traffic channel segments. User/device/session/resource information 348 also includes stored receiver characteristic information 349. The stored receiver characteristic information 349 includes receiver filter type information 372, amplifier type information 374, and analog to digital converter sampling rate information 376. Stored receiver characteristic information 349 also includes factory and/or field calibration parameters associated with the wireless receiver. At least some of the calibration parameters may be updated on an ongoing basis dynamically by the receiver, e.g., via self-calibration, e.g., to adjust for temperature, aging, power level, etc.

System data/information 350 includes a plurality of sets of base station system data/information (BS 1 data/information 378, . . . , BS M data/information 380). BS 1 data/information 378 includes uplink timing structure information 382, uplink frequency structure information 384, downlink timing structure information 386, and downlink frequency structure information 388. System data/information 350 also includes dedicated control channel report information 382 which includes DL saturation level self-noise SNR report information 384 including quantization level information/format information 386.

Terminal identification information 352 includes a base station assigned wireless terminal active user identifier which associates the wireless terminal with a set of dedicated control channel segments within an uplink timing and frequency structure being used by the base station, to be used by the wireless terminal to communicate uplink signals including DL saturation level self-noise SNR reports. Timing information 354 includes the current timing of the wireless terminal with respect to repetitive downlink and uplink timing structures being used by the base station to which the wireless terminal is connected, e.g., an indexed OFDM symbol transmission time period within a repetitive structure of multiple OFDM symbol time periods. Data 358 includes user data, e.g., voice, audio, image, text, and/or file data/information pertaining to a communications session, received via downlink traffic channel segments and/or to be transmitted via uplink traffic channel segments assigned to the wireless terminal. Measured received pilot signal power ($GP_0$) 360 is an output of pilot signal measurement module 332. Measured received null power 362 and determined interference power (N) 364 are outputs of null measurement module 330. Determined SNR of received pilot signal ($SNR_0$) 366 is an output of pilot signal SNR module 346. Calculated DL SNR saturation level 368 is an output of calculation module 336. Downlink saturation level of self-noise SNR report information 370 includes information which is output from report generation module 338 and represents a quantized version of calculated information 368.

Figure 4:
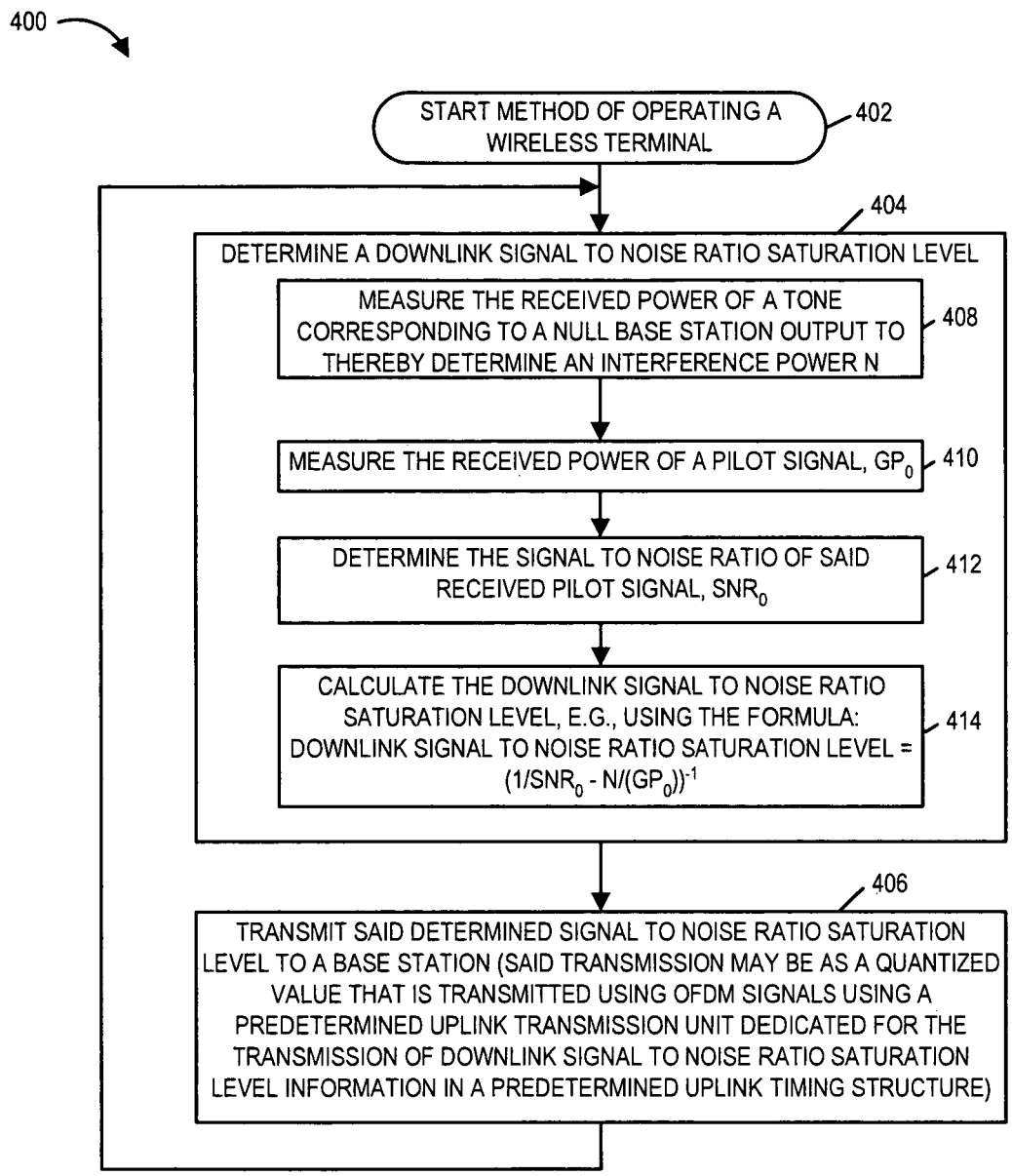
FIG. 4 is a flowchart of an exemplary method of operating a wireless terminal, in accordance with the present invention.

FIG. 4 is a drawing of a flowchart 400 of an exemplary method of operating a wireless terminal in accordance with the present invention. Operation starts in step 402, where the wireless terminal is powered on and initialized. In some embodiments, in step 402, the wireless terminal establishes a connection with a base station attachment point and is assigned an identifier associated with dedicated control channel segments in an uplink timing and frequency structure. Operation proceeds from step 402 to step 404.

In step 404, the wireless terminal is operated to determine a downlink signal to noise ratio saturation level. For example, in some embodiments, the downlink signal to noise ratio saturation level is a downlink signal to noise ratio that the wireless terminal would measure on a received signal that was transmitted by a base station at infinite power. In some embodiments, the signal to noise ratio saturation level is a function of wireless terminal self-noise. In various embodiments, the step of determining a downlink signal to noise ratio saturation level is based on measured channel estimation errors. In some embodiments, the step of determining a downlink signal to noise ratio saturation level is based on at least one receiver characteristic of a receiver module included in the wireless terminal. For example, the at least one receiver characteristic is one of receiver filter type, amplifier type, and analog digital converter sampling rate.

Step 404 includes sub-steps 408, 410, 412, and 414. In sub-step 408, the wireless terminal is operated to measure the received power of a tone corresponding to a null base station output to thereby determine an interference power N. For example, the tone corresponding to the null base station output, in some embodiments, corresponds to one of a downlink cell null tone segment and a downlink sector null tone segment. In some embodiments, the received power on multiple null tones is considered in determining the interference power N. In sub-step 410, the wireless terminal is operated to measure the received power of a pilot signal, $GP_0$. Operation proceeds from sub-step 410 to sub-step 412. In sub-step 412, the wireless terminal is operated to determine the signal to noise ratio of said received pilot signal, $SNR_0$. Operation proceeds from sub-step 412 to sub-step 414. In sub-step 414, the wireless terminal is operated to calculate the downlink signal to noise ratio saturation level, e.g., using the formula: downlink signal to noise ratio saturation level=$(1/SNR_0-N/(GP_0))^{-1}$. Operation proceeds from step 404 to step 406.

In step 406, the wireless terminal is operated to transmit said determined signal to noise ratio saturation level to a base station. The transmission of step 406 may be as a quantized value that is transmitted using OFDM signals using a predetermined uplink transmission unit dedicated for the transmission of downlink signal to noise ratio saturation level information in a predetermined uplink timing structure. In some embodiments, the predetermined uplink transmission unit is a dedicated control channel segment, as part of an uplink dedicated control channel dedicated to the wireless terminal. An exemplary dedicated control channel segment, in some embodiments, includes 21 OFDM tone-symbols, each tone-symbol used for conveying a modulation symbol value, e.g., a QPSK modulation symbol value.

In some embodiments, the transmitting step 406 transmits a report in the form of one of a plurality of predetermined report values. For example, the predetermined report values are 4 bit values, each value corresponding to a different quantization level. In one exemplary embodiment, the 4 information bits of the report convey one of 16 different levels ranging from 8.75 dBs to 29.75 dBs.

Operation proceeds from step 406 to step 404 such that the steps of determining a downlink signal to noise ratio saturation level and transmitting the determined signal to noise ratio saturation level are repeated. In some embodiments, the wireless terminal continues repeating steps 404 and step 406 while the wireless terminal continues to be allocated a set of dedicated control channel segments, e.g., as an active user.

In some embodiments, prior to said transmitting step 406, the wireless terminal is operated to determine as to whether said determined downlink signal to noise ratio saturation level is to be transmitted in an uplink transmission segment in which said wireless terminal can select to transmit said downlink signal to noise ratio saturation level or other information. For example, one exemplary embodiment has, within a recurring uplink dedicated control channel structure, some segments which are predetermined to be used by the wireless terminal to transmit a downlink signal to noise ratio saturation report and some segments which the wireless terminal may select to transmit a downlink signal to noise ratio saturation report from among a plurality of different types of reports which may be communicated in that segment.

Figure 5:
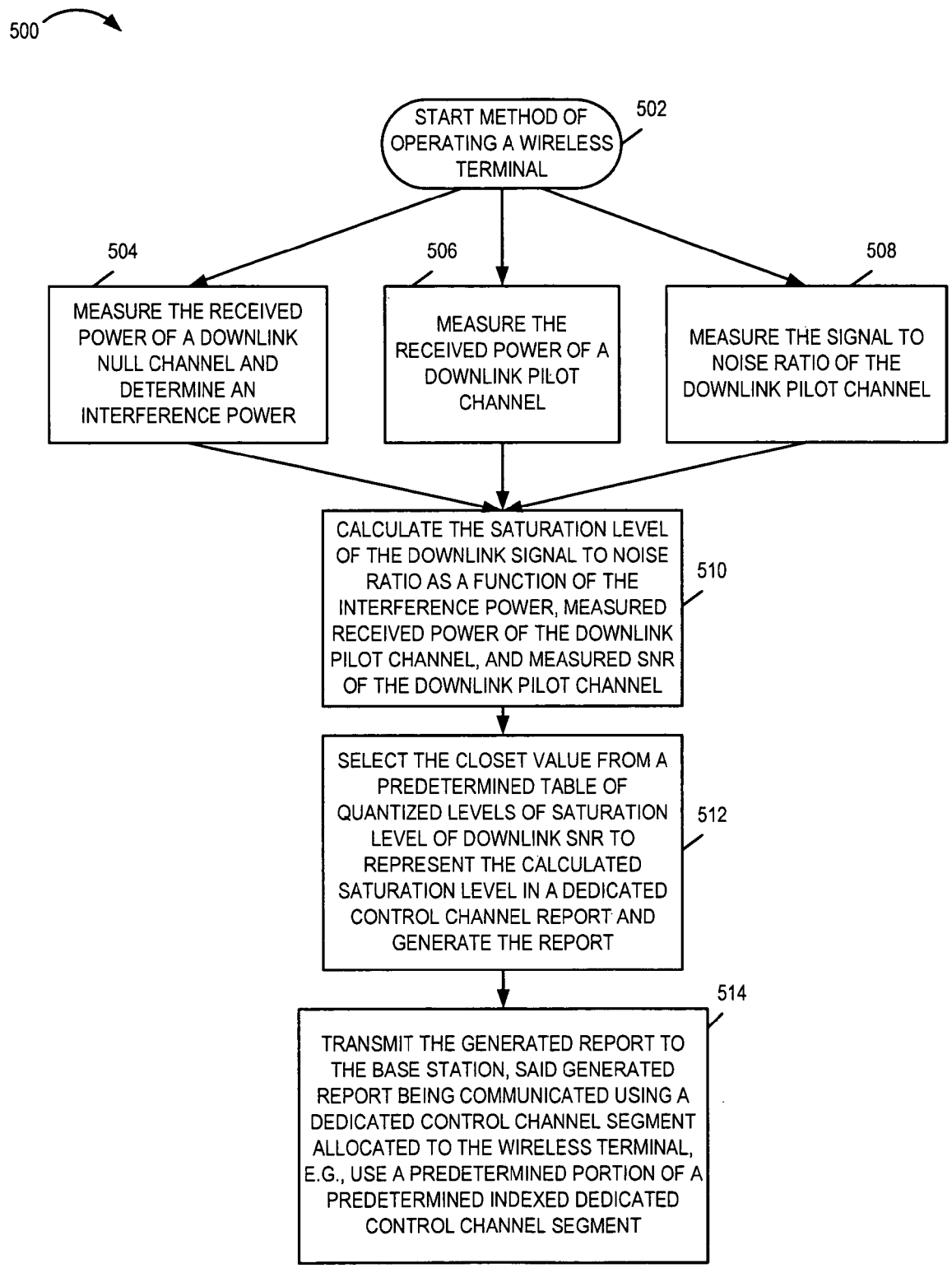
FIG. 5 is a flowchart of an exemplary method of operating a wireless terminal, in accordance with the present invention.

FIG. 5 is a drawing of a flowchart 500 of an exemplary method of operating a wireless terminal in accordance with the present invention. Operation starts in step 502 where the wireless terminal is powered on and initialized. Operation proceeds from step 502 to steps 504, 506, and 508. In step 504, the wireless terminal measures the received power of a downlink null channel (DL.NCH) and determines an interference power (N). For example, the Null channel corresponds to predetermined tone-symbols in an exemplary downlink timing and frequency structure used by the base station serving as the current attachment point for the wireless terminal in which the base station intentionally does not transmit using those tone-symbols; therefore, received power on the NULL channel measured by the wireless terminal receiver represents interference. In step 506, the wireless terminal measures the received power ($G^*P_0$) of a downlink pilot channel (DL.PICH). In step 508, the wireless terminal measures the signal to noise ratio ($SNR_0$) of the downlink pilot channel (DL.PICH). Operation proceeds from steps 504, 506, and 508 to step 510.

In step 510, the wireless terminal calculates the saturation level of the downlink signal to noise ratio as a function of: the interference power, measured received power of the downlink pilot channel, and measured SNR of the downlink pilot channel. For example, saturation level of the DL $SNR=1/a_0=(1/SNR_0-N/(GP_0))^{-1}$. Operation proceeds from step 510 to step 512. In step 512, the wireless terminal selects the closet value from a predetermined table of quantized level of saturation level of downlink SNR to represent the calculated saturation level in a dedicated control channel report, and the wireless terminal generates the report. Operation proceeds from step 512 to step 514. In step 514, the wireless terminal transmits the generated report to the base station, said generated report being communicated using a dedicated control channel segment allocated to the wireless terminal, e.g., using a predetermined portion of a predetermined indexed dedicated control channel segment. For example, the exemplary WT may be in a full-tone format mode of DCCH operation using the repetitive reporting structure and the report may be a four information bit DLSSNR report, e.g., DLSSNR4, of a DCCH segment included as part of one of the indexed DCCH segments in the repetitive reporting structure.

An exemplary 4 bit saturation level of downlink self-noise SNR report (DLSSNR4) will now be described. In some embodiments, the WT derives the saturation level of the DL SNR, which is defined to be the DL SNR that the WT receiver would measure on a received signal if the base station sector (BSS) transmitted the signal at infinite power. The saturation level can be, and in some embodiments is, determined by the self-noise of the WT receiver, which may be caused by factors such as channel estimation errors. The following is an exemplary method to derive the saturation level of the DL SNR.

In the exemplary method, the WT assumes that if the BSS transmits at power P, the DL SNR is equal to $SNR(P)=GP/(a_0GP+N)$, where G represent the wireless channel path gain from the BSS to the WT, so GP is the received signal power, P is the transmission power, N represents the received interference power, $a_0GP$ represents the self-noise, where a higher value of $a_0$ denotes a higher value of self-noise. G is a value between 0 and 1, $a_0$, P, and N are positive values. In this model, by definition, the saturation level of the DL SNR is equal to $1/a_0$. In some embodiments, the WT measures the received power of a downlink Null channel (DL.NCH) to determine the interference power N, measures the received power (denoted as $G^*P_0$) of the downlink pilot channel and SNR (denoted by $SNR_0$) of the downlink pilot channel; the WT then calculates $1/a_0=(1/SNR_0-N/(GP_0))^{-1}$.

Figure 6:
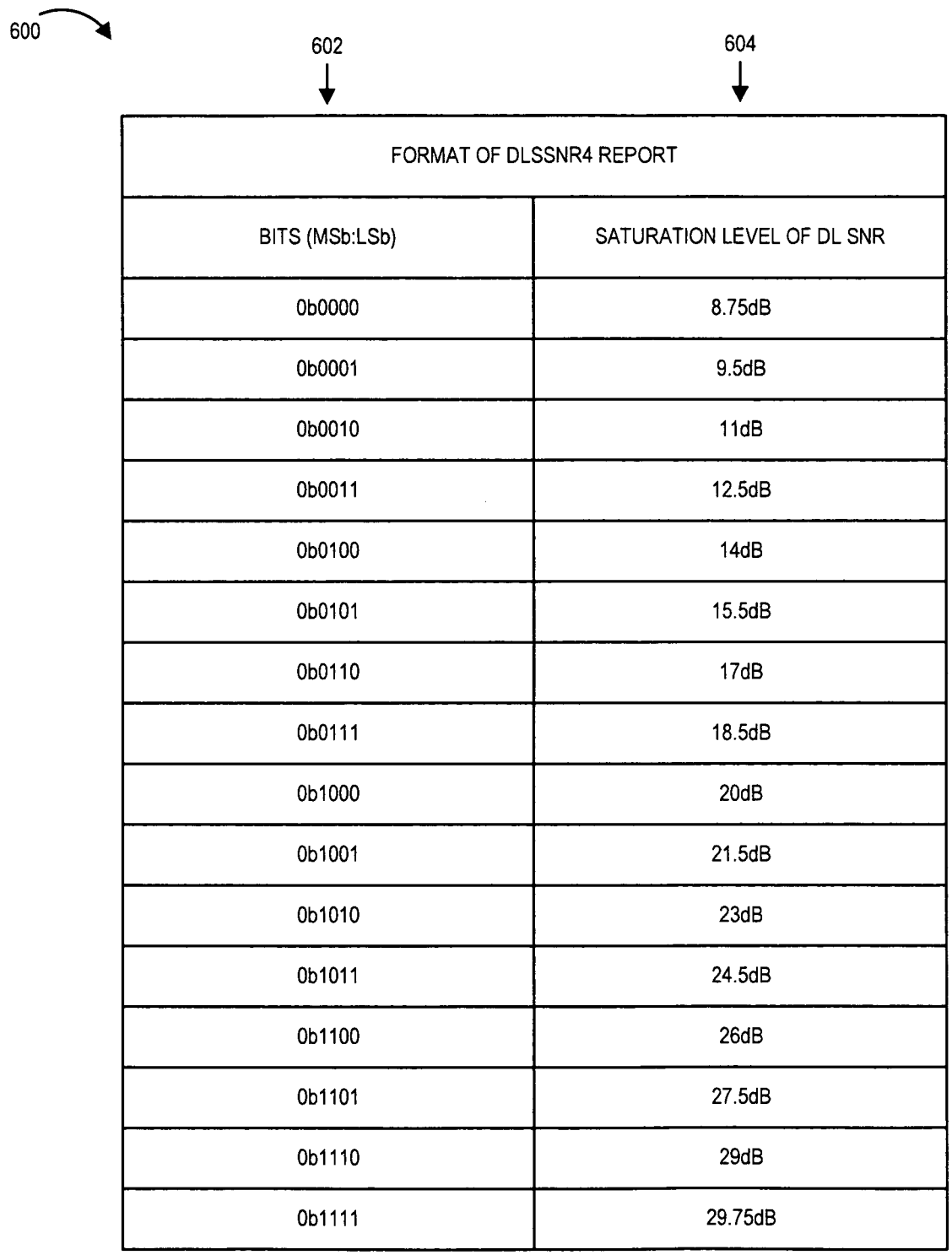
FIG. 6 is a table illustrating format, information bit mapping, and quantization levels for an exemplary report of saturation level of downlink self-noise SNR, in accordance with the present invention.

Once the WT has derived the saturation level of the DL SNR, the WT reports it by using the closest entry to the derived value in a DL self-noise saturation level report table. Table 600 of FIG. 6 is such an exemplary table describing the format of DLSSNR4. First column 602 indicates the 16 different possible bit patterns that can be conveyed by the DLSSNR4 report, and second column 604 lists saturation levels of DL SNR that are communicated corresponding to each bit pattern ranging from 8.75 dB to 29.75 dBs.

Figure 7:
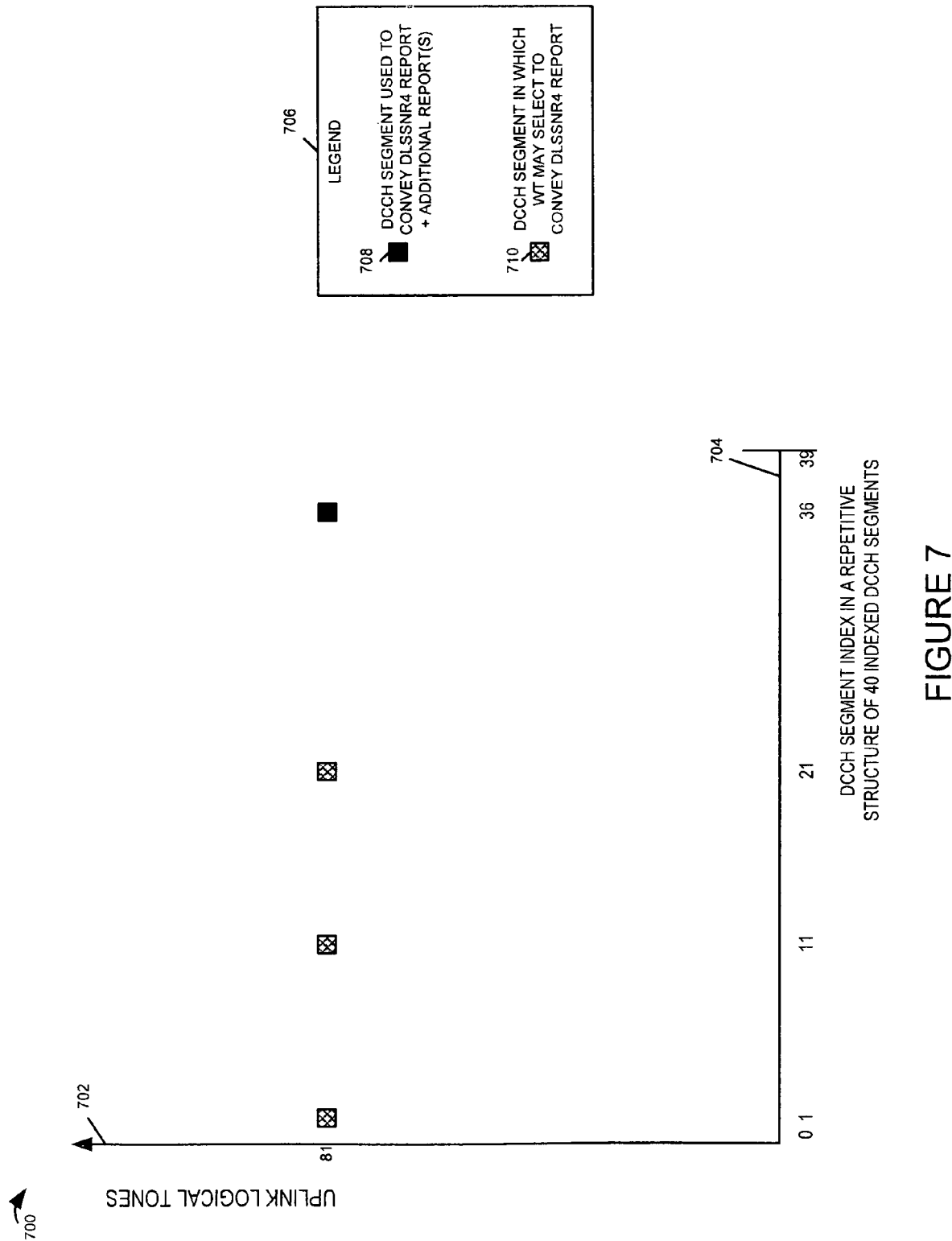
FIG. 7 is a drawing illustrating exemplary dedicated control channel segments in a repetitive frequency/timing structure which are allocated to a wireless terminal for use in communicating reports of saturation level of downlink self-noise SNR.

FIG. 7 is a drawing 700 illustrating exemplary dedicated control channel segments in an exemplary frequency/timing structure allocated to a wireless terminal associated with a dedicated control channel logical tone used to convey a report of the saturation level of downlink self-noise SNR. Vertical axis 702 represents uplink logical tones in an exemplary uplink frequency structure being used by a base station sector attachment point. For example, an exemplary uplink tone block corresponding to the attachment point may use 113 contiguous tones and a subset of those, e.g., the 31 tones indexed 81 . . . 111 may be used for dedicated control channel segments. In this example, logical tone 81 has been allocated to a wireless terminal using the base station sector attachment point. Horizontal axis 704 represents DCCH segment index in a repetitive structure of 40 indexed segments (0 . . . 39). An exemplary DCCH segment, in some embodiments comprises one logical tone for the duration of 21 OFDM symbol transmission time periods corresponding to 21 OFDM tone-symbols.

Legend 706 indicates that DCCH segments represented by full shading 708 are used to convey a four bit downlink self-noise saturation level SNR report (DLSSNR4) and additional report(s). For example, the exemplary segment conveys 6 information bits and 4 of those 6 information bits represent the DLSSNR4 report. Legend 706 indicates that DCCH segments represented by cross-hatch shading 710 are segments in which the WT may select to convey a four bit downlink saturation level of self-noise SNR report (DLSSNR4) and additional report(s). For example for such DCCH segments the WT may select between sending a DLSSNR4 report and a four bit uplink traffic channel request report.

In this example of FIG. 7, the exemplary WT has been allocated logical uplink tone 81 and transmits DCCH signals using 40 DCCH segments in a repetitive structure. For each set of 40 DCCH segments allocated to the WT, indexed segment 36 is to be used to convey the DLSSNR4 report. For each set of 40 DCCH segments allocated to the WT, indexed segments 1, 11, and 21 may be used to convey the DLSSNR4 report at the discretion of the WT.

Figure 8:
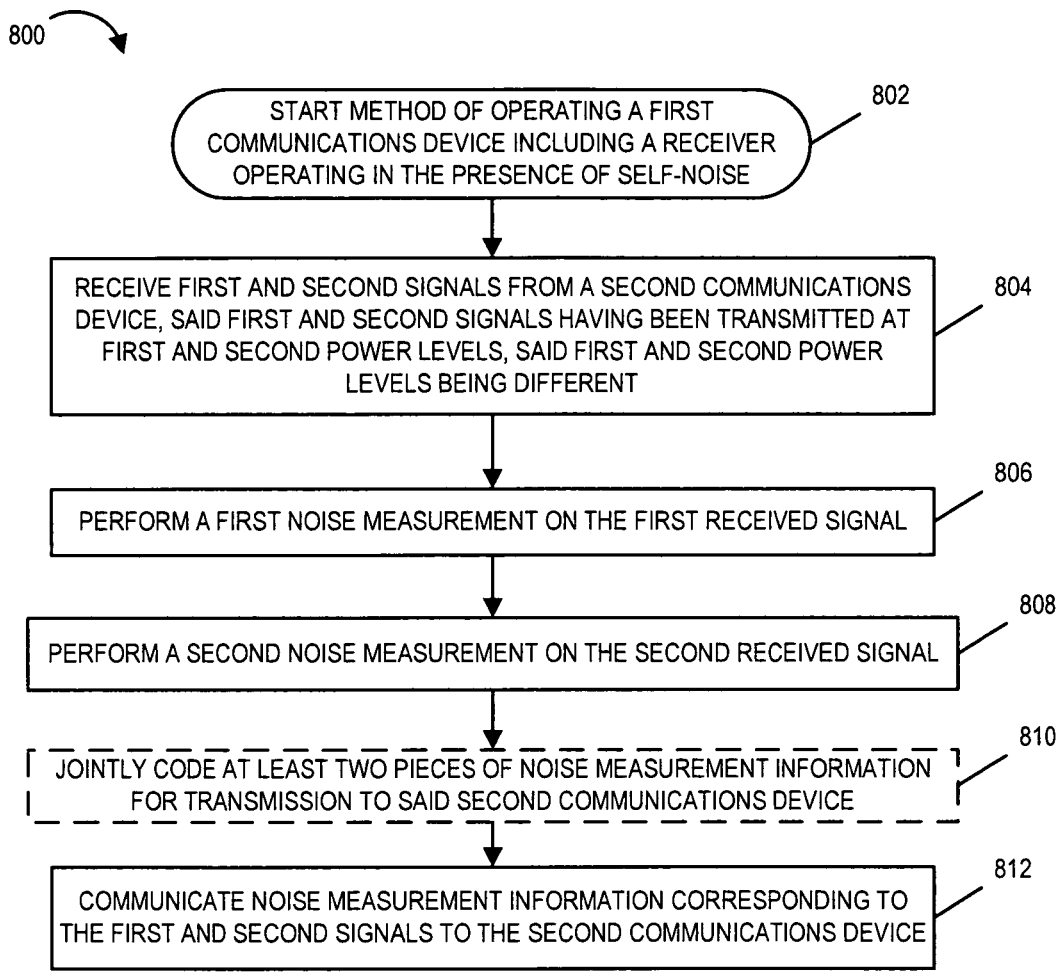
FIG. 8 is a drawing of an exemplary method of operating a communications device in accordance with the present invention.

FIG. 8 is a drawing of a flowchart 800 of an exemplary method of operating a first communications device in accordance with the present invention, said first communications device operating in the presence of self-noise. In some embodiments, the first communications device is a wireless terminal such as a mobile node. In some embodiments, the first communications device is a man portable communications device. In various embodiments, the first communications device is a handheld communications device which supports data communications sessions. In some embodiments, the first communications device is a communications device which supports voice communications between the first communications device and a second communications device.

The exemplary method starts in step 802 and proceeds to step 804. In step 804, the first communications device receives first and second signals from a second communications device, said first and second signals having been transmitted at first and second power levels, said first and second power levels being different. In some embodiments, the second communications device is a base station. In various embodiments, the step of receiving first and second signals includes receiving said first and second signals over an airlink. In various embodiments, the second signal was transmitted as a NULL signal. In some embodiments, the first signal is a pilot signal. In some embodiments, the first signal corresponds to at least one tone of an OFDM symbol. In various embodiments, the first and second signals each include at least one tone within the same OFDM symbol. For example an exemplary OFDM symbol, in some embodiments, includes 113 tones, and some of the OFDM symbols include one or more non-zero pilot tone symbol and one or more intentional NULL tones. In some embodiments, the first and second signals are signals which are transmitted at predetermined power levels and wherein at least one of said first and second signals are signals which were transmitted at predetermined phase. For example, the first signal is in some embodiments, a pilot signal transmitted at a non-zero predetermined power level with respect to a base station reference power level and transmitted at a predetermined phase, and the second signal is an intentional NULL signal transmitted at zero power level. In some embodiments, the first signal is transmitted at a first non-power level and the second signal is transmitted at a second non-zero power level. For example, in some embodiments, the first signal is a first pilot signal transmitted at a first non-zero power level and the second signal is a second pilot signal transmitted at a second non-zero power level. In some embodiments, the first signal is a first pilot signal transmitted at a first non-zero power level and the second signal is a different broadcast signal transmitted at a second non-zero power level, e.g., a beacon signal, an assignment signal, an identification signal, etc. In some embodiments, the first signal is a broadcast signal communicated at a predetermined power level, e.g., a timing and synchronization broadcast signal, and the second signal is an intentional Null signal. In some such embodiments, the broadcast signal and intentional Null signal are communicated each using at least some tones of the same OFDM symbol. Operation proceeds from step 804 to step 806.

In step 806, the first communications device performs a first noise measurement on the first received signal, and in step 808, the first communications device performs a second noise measurement on the second received signal. In some embodiments, the first noise measurement is a measured signal to noise ratio of the first received signal. The second measurement may, but need not be in all embodiments, a type of measurement which is the same as or similar to the first measurement. In some embodiments, the second noise measurement is a measured signal to noise ratio of the second received signal. In some embodiments, the first noise measurement provides power information about the first received signal, said first received signal having been transmitted at a predetermined non-zero power level and phase and noise having been subsequently introduced into the first signal. In some embodiments, the second noise measurement provides power information of the second received signal, said second received signal having been transmitted at a zero power level and noise having been subsequently introduced into the second signal. In some embodiments, operation proceeds from step 808 to step 810, while in other embodiments, operation proceeds from step 808 to step 812.

In step 810, the first communications device jointly codes at least two pieces of noise measurement information for transmission to said second communications device. In some embodiments, the at least two pieces of noise measurement information jointly coded are jointly coded as part of a dedicated control channel report, e.g., a self-noise saturation level report. In some embodiments, the at least two pieces of noise measurement information jointly coded are jointly coded as part of different reports communicated in the same dedicated control channel segment, e.g., a first report communicating a first SNR report associated with a first transmission power level and a second report communicating a second SNR report associated with a second transmission power level, said two pieces of jointly coded noise information providing the second communications device with information to determine a self-noise saturation level value to be associated with the first communications device. Operation proceeds from step 810 to step 812.

In step 812, the first communications device communicates noise measurement information corresponding to the first and second signals to the second communications device. In various embodiments quantization is used in the communicating of step 812. In some embodiments, the communicated noise measurement information of step 812 includes one of: i) a theoretical signal to noise ratio assuming a signal transmitted by the second communications device was transmitted at an infinite power level and assuming the receiver could process such a signal; and (ii) an adjusted theoretical signal to noise ratio assuming a signal transmitted by the second communications device was transmitted at an infinite power level and assuming the receiver could process such a signal. In some such embodiments adjusted means applying an offset in dBs by a predetermined amount. In some embodiments, the communicated noise measurement information of step 812 includes at least two of: (i) a theoretical signal to noise ratio of a signal transmitted by the second communications device and received by the first communications device in the event the first communications device did not introduce any self-noise; (ii) a theoretical signal to noise ratio of a signal transmitted at a first predetermined power level relative to the transmission power level of one of the first and second received signal; (iii) a theoretical signal to noise ratio of a signal transmitted at a second predetermined power level relative to the transmission power level of one of the first and second received signal, said second predetermined power level being different from said first predetermined power level; (iv) a measured signal to noise ratio of the first received signal; (v) a measured signal to noise ratio of said second received signal; (vi) a measured power level of the first received signal; (vii) a measured power level of the second received signal; (viii) an adjusted theoretical signal to noise ratio of a signal transmitted by the second communications device and received by the first communications device in the event the first communications device did not introduce any self-noise; (ix) an adjusted theoretical signal to noise ratio of a signal transmitted at a first predetermined power level relative to the transmission power level of one of the first and second received signal; (x) an adjusted theoretical signal to noise ratio of a signal transmitted at a second predetermined power level relative to the transmission power level of one of the first and second received signal, said second predetermined power level being different from said first predetermined power level; (xi) an adjusted measured signal to noise ratio of the first received signal; (xii) an adjusted measured signal to noise ratio of said second received signal; (xiii) an adjusted measured power level associated with the first received signal; and (xiv) an adjusted measured power level associated with the second received signal. In some such embodiments adjusted means applying an offset in dBs by a predetermined amount.

In various embodiments, said first and second signals are transmitted on a predetermined basis and noise measurement information is communicated to the second communications device at least once in a beaconslot, said beaconslot being a grouping of a fixed number of OFDM symbol transmission time periods in a recurring timing structure, said fixed number of OFDM symbol transmission time periods being at least 901 consecutive OFDM symbol transmission time periods. For example, in some embodiments, said noise measurement information is communicated at least once during each beaconslot for a wireless terminal operating in a full-tone mode of DCCH operation, e.g., at least one downlink self-noise saturation SNR DCCH channel report is communicated per beaconslot in accordance with a predetermined channel structure.

In some embodiments, said first and second signals are transmitted on a predetermined basis and noise measurement information is communicated to the second communications device multiple times in a superslot, said superslot being a grouping of a fixed number of OFDM symbol transmission time periods in a recurring timing structure, said fixed number of OFDM symbol transmission time periods being at least 101 consecutive OFDM symbol transmission time periods. For example, in some embodiments, said first and second signals are non-zero pilot signals transmitted at different power levels and the noise measurement information includes a first quantized SNR value corresponding to measurements of said first signal and a second quantized SNR value corresponding to measurements of said second signal, said noise measurement information is communicated multiple times during each superslot for a wireless terminal operating in a full-tone mode of DCCH operation, e.g., using dedicated control channel reports in accordance with a predetermined channel structure. In some such embodiments, the second communications device, e.g., base station, receiving the dedicated control channel reports conveying the noise measurement information from a wireless terminal uses the received information to determine a downlink self-noise saturation level SNR value which is associated with the wireless terminal.

In various embodiments, a downlink self-noise saturation level SNR value associated with a wireless terminal, communicated either directly or indirectly, is used by the base station acting as the wireless terminals physical attachment point in determining downlink traffic channel segment information, e.g., assignment of downlink traffic channel segments to particular wireless terminals, transmission power level to be associated with a particular downlink traffic channel segment at a particular time, and/or data rate option to be used for a particular downlink traffic channel segment at a particular time.

The techniques of the present invention may be implemented using software, hardware and/or a combination of software and hardware. The present invention is directed to apparatus, e.g., mobile nodes such as mobile terminals, base stations, communications system which implement the present invention. It is also directed to methods, e.g., method of controlling and/or operating mobile nodes, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments nodes described herein are implemented using one or more modules to perform the steps corresponding to one or more methods of the present invention, for example, null measurement, channel estimation, calculation of DL SNR saturation level, report generation, etc. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s)

While described in the context of an OFDM system, at least some of the methods and apparatus of the present invention, are applicable to a wide range of communications systems including many other frequency division multiplexed systems and non-OFDM and/or non-cellular systems. Many of the methods and apparatus of the present invention are also applicable in the context of a multi-sector multi-cell wireless communications system.

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of operating a wireless terminal, the method comprising:
   i) measuring received power of a tone corresponding to a NULL base station output;
   ii) determining, based on the measured power of the tone corresponding to a NULL base station output, a downlink signal to noise ratio saturation level; and
   iii) operating a transmitter to transmit said determined signal to noise ratio saturation level.

2. The method of claim 1, wherein said transmitting includes transmitting said signal to noise ratio saturation level to a base station.

3. The method of claim 2, wherein said transmitting includes transmitting said signal to noise ratio saturation level as a quantized value having a fixed predetermined number of bits that is transmitted using OFDM signals.

4. The method of claim 2, wherein said transmitting step is performed in a predetermined uplink transmission unit dedicated for the transmission of downlink signal to noise ratio saturation level information in a predetermined uplink timing structure.

5. The method of claim 4, further comprising:
   repeating steps i), ii) and iii).

6. The method of claim 5, wherein said transmitting step is performed in accordance with the occurrence of transmission units dedicated for the transmission of downlink signal to noise ratio saturation level information on an uplink channel dedicated to said wireless terminal.

7. The method of claim 1, wherein said transmitting step includes transmitting a report in the form of one of a plurality of predetermined report values.

8. A method of operating a wireless terminal, the method comprising:
   i) determining a downlink signal to noise ratio saturation level;
   ii) operating a transmitter to transmit said determined signal to noise ratio saturation level; and
   wherein said downlink signal to noise ratio saturation level is a downlink signal to noise ratio that said wireless terminal would measure on a received signal that was transmitted by a base station at infinite power.

9. The method of claim 8, wherein said downlink signal to noise ratio saturation level is a function of wireless terminal self-noise.

10. The method of claim 8, wherein said step of determining said signal to noise ratio saturation level is based on measured channel estimation errors.

11. The method of claim 10, wherein said step of determining said signal to noise ratio saturation level is also based on at least one receiver characteristic of a receiver module included in said wireless terminal.

12. The method of claim 11, wherein said at least one receiver characteristic is one of: receiver filter type, amplifier type, and analog digital converter sampling rate.

13. A method of operating a wireless terminal, the method comprising:
   i) determining a downlink signal to noise ratio saturation level;
   ii) operating a transmitter to transmit said determined signal to noise ratio saturation level;
   wherein said transmitter is also operated to transmit a report in the form of one of a plurality of predetermined report values; and
   wherein the predetermined report values are 4 bit values, each value corresponding to a different quantization level.

14. A method of operating a wireless terminal, the method comprising:
   i) determining a downlink signal to noise ratio saturation level;
   ii) transmitting said determined signal to noise ratio saturation level; and
   prior to performing said transmitting step, making a determination as to whether said downlink signal to noise ratio saturation level is to be transmitted in an uplink transmission unit dedicated to said wireless terminal in which said wireless terminal can select to transmit said downlink signal to noise ratio saturation level or other information.

15. The method of claim 14, wherein determining a downlink signal to noise ratio saturation level includes:
   measuring the received power of a tone corresponding to a NULL base station output to thereby determine an interference power N;
   measuring the received power of a pilot signal $GP_0$;
   determining the signal to noise ratio of said received pilot signal $SNR_0$; and
   calculating the downlink signal to noise ratio saturation level by the formula: downlink signal to noise ratio saturation level=$(1/SNR_0 - N/(GP_0))^{-1}$.

16. A wireless terminal, the wireless terminal comprising:
   a module for measuring received power of a tone corresponding to a NULL base station output;
   a downlink signal to noise ratio saturation level determination module for determining a downlink signal to noise ratio saturation level based on the measured power of the tone corresponding to a NULL base station output; and
   a transmitter for transmitting said determined signal to noise ratio saturation level.

17. The wireless terminal of claim 16,
   wherein said transmitter includes an OFDM transmitter.

18. The wireless terminal of claim 16, wherein said transmitter is coupled to an antenna used to transmit said signal to noise ratio saturation level to a base station.

19. The wireless terminal of claim of claim 18, further comprising: memory including uplink timing structure information; and
   a transmission control module for controlling, as a function of said uplink timing structure information when said transmitter transmits said determined signal to noise ratio saturation level.

20. The wireless terminal of claim 19, wherein said transmission control module controls the transmission of downlink signal to noise ratio saturation level information in accordance with the occurrence of transmission units dedicated for the transmission of downlink to noise ratio saturation level information on a uplink channel dedicated to said wireless terminal as indicated by said uplink timing structure information.

21. The wireless terminal of claim 16, wherein said downlink signal to noise ratio saturation level is transmitted in the form of one of a plurality of predetermined report values.

22. A wireless terminal, the wireless terminal comprising:
   a downlink signal to noise ratio saturation level determination module;
   a transmitter for transmitting said determined signal to noise ratio saturation level; and
   wherein said downlink signal to noise ratio saturation level is a downlink signal to noise ratio that said wireless terminal would measure on a received signal that was transmitted by a base station at infinite power.

23. The wireless terminal of claim 22, wherein said signal to noise ratio saturation level is a function of wireless terminal self-noise.

24. The wireless terminal of claim 22, wherein said determination module includes a channel estimation measurement module for measuring channel estimation errors used in determining said signal to noise ratio saturation level.

25. The wireless terminal of claim 24, further comprising:
memory including stored receiver characteristic information used by said determination module to determine said signal to noise ratio saturation level.

26. The wireless terminal of claim 25, wherein said stored receiver characteristic information includes at least one of: receiver filter type, amplifier type, and analog digital converter sampling rate information.

27. A wireless terminal, the wireless terminal comprising:
a downlink signal to noise ratio saturation level determination module;
a transmitter for transmitting said determined signal to noise ratio saturation level;
wherein said downlink signal to noise ratio saturation level is transmitted in the form of one of a plurality of predetermined report values; and
wherein the predetermined report values are 4 bit values, each value corresponding to a different downlink signal to noise ratio saturation level quantization level.

28. A wireless terminal, the wireless terminal comprising:
means for measuring received power of a tone corresponding to a NULL base station output;
determination means for determining downlink signal to noise ratio saturation level based on the measured power of the tone corresponding to a NULL base station output; and
transmission means for transmitting said determined signal to noise ratio saturation level.

29. The wireless terminal of claim 28, wherein said transmission means includes an OFDM transmitter.

30. The wireless terminal of claim 28, wherein said transmission means is coupled to antenna means for transmitting said signal to noise ratio saturation level to a base station.

31. A non-transitory computer readable medium including machine executable instructions for use in a wireless terminal, the non-transitory computer readable medium comprising:
instructions for causing the wireless terminal to measure received power of a tone corresponding to a NULL base station output;
instructions for causing the wireless terminal to determine a downlink signal to noise ratio saturation level based on the measured received power of the tone corresponding to a NULL base station output; and
instructions for causing the wireless terminal to transmit said determined signal to noise ratio saturation level.

* * * * *